US011592843B2

(12) United States Patent
Tehrani et al.

(10) Patent No.: US 11,592,843 B2
(45) Date of Patent: Feb. 28, 2023

(54) AUTONOMOUS AIRCRAFT LOCAL PLANNING TO AVOID OBSTRUCTIONS

(71) Applicant: Lockheed Martin Corporation, Bethesda, MD (US)

(72) Inventors: Navid Dadkhah Tehrani, Providence, RI (US); Brian Henri Le Floch, Redondo Beach, CA (US); Ashish Bhatnagar, Union City, CA (US); Suraj Unnikrishnan, Palo Alto, CA (US); Brian Scott MacAllister, East Taunton, MA (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 413 days.

(21) Appl. No.: 16/843,011

(22) Filed: Apr. 8, 2020

(65) Prior Publication Data

US 2021/0318697 A1    Oct. 14, 2021

(51) Int. Cl.
*G05D 1/10* (2006.01)
*B64C 39/02* (2023.01)
*B64C 27/06* (2006.01)

(52) U.S. Cl.
CPC ............ *G05D 1/106* (2019.05); *B64C 27/06* (2013.01); *B64C 39/024* (2013.01); *B64U 2201/10* (2023.01)

(58) Field of Classification Search
CPC ...... G05D 1/106; B64C 27/06; B64C 39/024; B64C 2201/141
See application file for complete search history.

(56) References Cited

U.S. PATENT DOCUMENTS

| 9,412,278 | B1 * | 8/2016 | Gong ................. G08G 5/0039 |
| | | | 701/2 |
| 9,418,558 | B1 * | 8/2016 | Stamenkovich ......... G08G 3/02 |
| 9,620,022 | B2 | 4/2017 | Sane et al. |
| 9,696,160 | B2 | 7/2017 | Simpson et al. |
| 9,733,090 | B2 | 8/2017 | Simpson |
| 9,971,354 | B2 | 5/2018 | Cherepinsky et al. |
| 9,995,589 | B2 | 6/2018 | Yoshikawa |
| 10,126,750 | B2 | 11/2018 | Cherepinsky et al. |
| 10,254,768 | B2 | 4/2019 | Sane et al. |

(Continued)

FOREIGN PATENT DOCUMENTS

| CN | 108458717 A | 8/2018 |
| WO | WO-2018006454 A1 * | 1/2018 |

OTHER PUBLICATIONS

Youngjun Choi, Two-layer obstacle collision avoidance with machine learning for more energy-efficient unmanned aircraft trajectories, 2017, Elsevier, 0921-8890, 158-173 (Year: 2017).*

(Continued)

*Primary Examiner* — Elaine Gort
*Assistant Examiner* — Anthony M Gartrelle
(74) *Attorney, Agent, or Firm* — Foley & Lardner LLP

(57) ABSTRACT

A technique relates to autonomous obstacle avoidance. A vehicle is controlled on a route to a destination, the route being a three-dimensional route. An obstruction is determined on the global route. A local route including alternate points to avoid the obstruction is autonomously determined. The local route is autonomously converged back to the global route in response to avoiding the obstruction.

18 Claims, 18 Drawing Sheets

(56) References Cited

U.S. PATENT DOCUMENTS

| | | | |
|---|---|---|---|
| 2018/0023974 A1* | 1/2018 | Otani | G05D 1/0202 |
| | | | 701/3 |
| 2019/0051198 A1 | 2/2019 | Nimmagadda et al. | |
| 2019/0163191 A1 | 5/2019 | Sorin et al. | |
| 2019/0243388 A1 | 8/2019 | Zhang et al. | |
| 2020/0356100 A1* | 11/2020 | Nagarajan | G01C 21/3602 |
| 2021/0309251 A1* | 10/2021 | Vithaldas | G06F 11/3466 |

OTHER PUBLICATIONS

Kuwata, Y. et al., "Real-time Motion Planning with Applications to Autonomous Urban Driving," IEEE Transactions On Control Systems Technology, vol. 17, No. 5, Sep. 2009, pp. 1105-1118.

* cited by examiner

| ALGORITHM 1 LESS THAN COST COMPARISON |
| --- |
| 1: FUNCTION IsCost1LessThanCost2(c1, c2) |
| 2:     IF c1.RegionCost.RegionState= c2.RegionCost.RegionState THEN |
| 3:         return c1.DistanceCost < c2.DistanceCost |
| 4:     ELSE |
| 5:         return c1.RegionCost.RegionState < c2.RegionCost.RegionState |
| 6:     END IF |
| 7: END FUCTION |

FIG. 7

| TABLE 1: EXAMPLE OF SORTED COST OBJECTS | | |
| --- | --- | --- |
| RegionState=FREE | DISTANCE COST=100.000000 | TOTAL COST=100.000000 |
| RegionState=FREE | DISTANCE COST=110.000000 | TOTAL COST=110.000000 |
| RegionState=FREE | DISTANCE COST=120.000000 | TOTAL COST=120.000000 |
| RegionState=EXTRA_BUFFER | DISTANCE COST=70.000000 | TOTAL COST=70.000000 |
| RegionState=EXTRA_BUFFER | DISTANCE COST=80.000000 | TOTAL COST=80.000000 |
| RegionState=EXTRA_BUFFER | DISTANCE COST=90.000000 | TOTAL COST=90.000000 |
| RegionState=BUFFER | DISTANCE COST=40.000000 | TOTAL COST=40.000000 |
| RegionState=BUFFER | DISTANCE COST=50.000000 | TOTAL COST=50.000000 |
| RegionState=BUFFER | DISTANCE COST=60.000000 | TOTAL COST=60.000000 |
| RegionState=OCCUPIED | DISTANCE COST=3.000000 | TOTAL COST=10000000000003.000000 |
| RegionState=OCCUPIED | DISTANCE COST=12.000000 | TOTAL COST=10000000000012.000000 |
| RegionState=OCCUPIED | DISTANCE COST=34.000000 | TOTAL COST=10000000000034.000000 |

FIG. 8

ALGORITHM 2 EXPAND TREE

1: FORM SAMPLED NODE $q_s$
2: SORT THE NODES IN TREE USING HEURISTICS
3: iter ← 1
4: FOR EACH NODE $q \in T$, IN SORTED ORDER DO
5:     FORM A REFERENCE PATH $\bar{r}_{ref} = \{q_{root}, \ldots, q, q_s\}$
6:     CALCULATE PREDICTED TRAJECTORY $\hat{\bar{x}} = TrajPredictor(\bar{r}_{ref})$
7:     IF $\hat{\bar{x}} \in \chi_{free}$ THEN
8:         ADD $q_s$ TO TREE. BREAK
9:     ELSE IF iter > $iter_{max}$ THEN
10:        BREAK
11:    END IF
12:    iter ← iter + 1
13: END FOR
14: DONE

FIG. 9

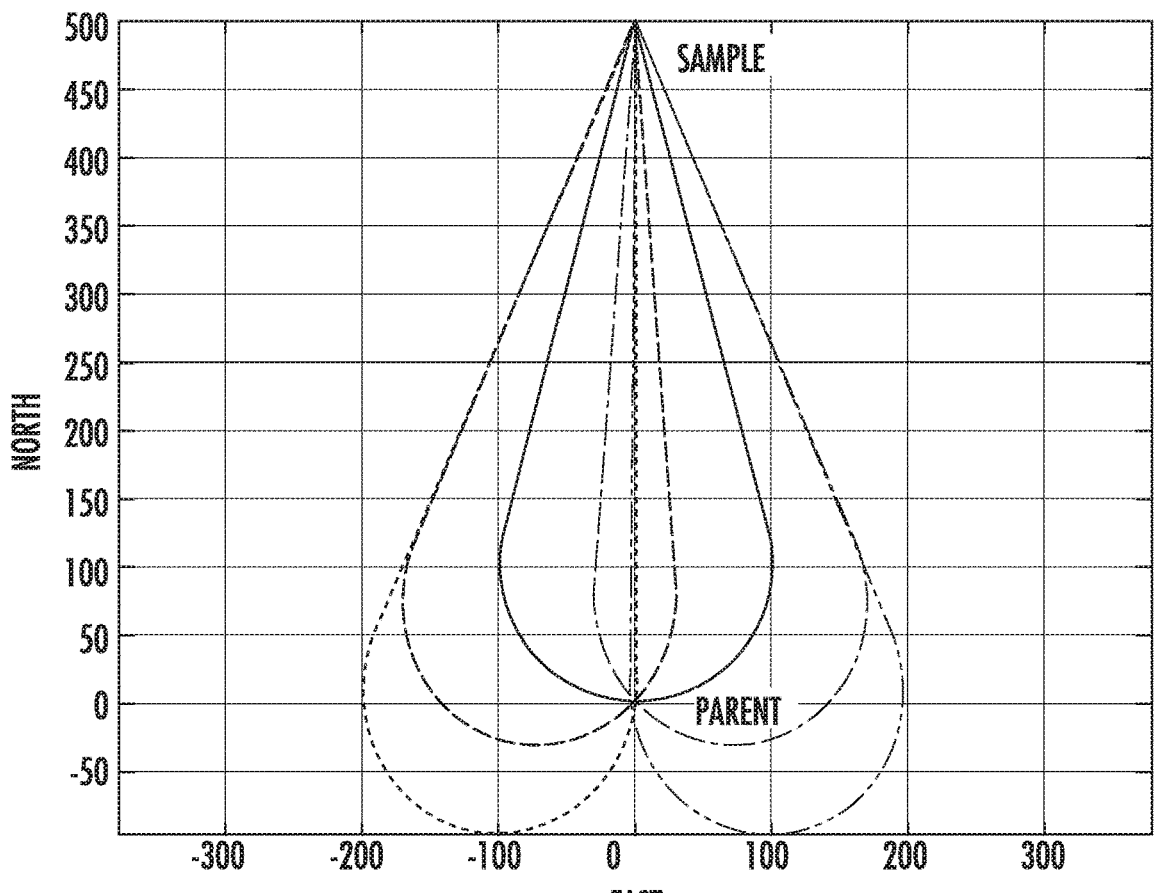

ALGORITHM 3 MOVE ROOT

1: FORM BEST REFERENCE PATH $\bar{r}_{ref,best}$
2: CALCULATE PREDICTED TRAJECTORY $\hat{\bar{x}}_{best} = \text{TrajPredictor}(\bar{r}_{ref,best})$
3: $\hat{\bar{x}}_{root} \leftarrow \hat{\bar{x}}_{best}(\Delta t)$
4: $q_{child\_of\_root}$ =NODE TRACKED BY TRAJ-PREDICTOR AT TIME $\Delta t$
5: $q_{child\_of\_root}.\text{PARENT} \leftarrow q_{root}$ ALGORITHM 4 PruneTree(q.new_root,q.old_root)

1: stack.push(q_old_root)
2: WHILE ! isempty(stack) DO
3:     q = stack.pop()
4:     FOR EACH CHILD q_child of q DO
5:         IF q_child ≠ q_new_root THEN            △ DELETE NODE q FROM THE TREE
6:             stack.push (q_child)
7:         END IF
8:     END FOR
9:     T.delete(q)
10: END WHILE

FIG. 15

| ALGORITHM 5 EXECUTION LOOP OF CL-RRTAV WITHOUT GLOBAL FOLLOWING |
|---|
| 1: REPEAT |
| 2: UPDATE THE CURRENT VEHICLE STATE $\vec{x}(t_0)$ AND ENVIRONMENTAL CONSTRAINTS $\chi_{free(t)}$ |
| 3: UPDATE LOCAL GOAL POSITION |
| 4:     $\vec{r}_{ref,best}[1] \leftarrow \vec{x}(t_0); \vec{x}(t_0 + \Delta t) \leftarrow TrajPredictor(\vec{r}_{ref,best})$ AT TIME $\Delta t$ |
| 5:     MoveRoot() |
| 6:     IF $\|\vec{x}(t_0+\Delta t) - \vec{x}_{root}\| > d_{max}$ THEN       ▷ ROOT AND PREDICTED VEHICLE POSITION ARE TOO FAR APART |
| 7:             $\vec{x}_{root} \leftarrow \vec{x}(t_0+\Delta t)$                      ▷ SET ROOT STATE TO PREDICTED VEHICLE STATE |
| 8:             DELETE ALL NODES IN TREE OTHER THAT ROOT |
| 9:     ELSE |
| 10:            PruneTree() |
| 11:    END IF |
| 12:    REPEAT |
| 13:            ExpandTree() |
| 14:    UNTIL TIME LIMIT $\Delta t$-$\delta$ IS REACHED |
| 15:    SORT PREDICTED TRAJECTORIES IN TREE |
| 16:    FOR EACH REFERENCE PATH $\vec{r}_{ref}$ IN THE TREE, IN SORTED ORDER DO |
| 17:            $\vec{r}_{ref}[1] \leftarrow \vec{x}(t_0 + \Delta t); \hat{\vec{x}}_{reprop} \leftarrow TrajPredictor(\vec{r}_{ref})$       ▷ REPROPAGATE FROM PREDICTED VEHICLE STATE |
| 18:            IF $\hat{\vec{x}}_{reprop} \in \chi_{free}(t)$ THEN |
| 19:                    $\vec{r}_{ref,best} \leftarrow \vec{r}_{ref}$ |
| 20:                    SEND $\vec{r}_{ref,best}$ TO TRAJECTORY FOLLOWER FOR EXECUTION |
| 21:                    goto LINE 2 |
| 22:            END IF |
| 23:    END FOR |
| 24:    NO PLAN: PERFORM EMERGENCY ACTION |
| 25: UNTIL THE VEHICLE REACHES THE GOAL REGION |

FIG. 16

```
ALGORITHM 6 EXECUTION LOOP OF CL-RRTAV WITH GLOBAL FOLLOWING PROCEDURE IN BLUE
1:  GLOBAL FOLLOWING ← INACTIVE
2:  REPEAT
3:      UPDATE THE CURRENT VEHICLE STATE x̄(t₀) AND ENVIRONMENTAL CONSTRAINTS X_free(t)
4:      r̄_ref,best[1] ← x̄(t₀); x̄(t₀+Δt) ← TrajPredictor(r̄_ref,best) AT TIME Δt
5:      MoveRoot()
6:      IF ||x̄(t₀+Δt) - x̄_root|| > d_max THEN      ▷ ROOT AND PREDICTED VEHICLE POSITION ARE TOO FAR APART
7:          x̄_root ← x̄(t₀+Δt)                      ▷ SET ROOT STATE TO PREDICTED VEHICLE STATE
8:          DELETE ALL NODES IN TREE
9:      ELSE
10:         PruneTree()
11:     END IF
12:     IF GLOBAL FOLLOWING IS INACTIVE THEN
13:         r̄_ref,global ← GlobalFollowing(r̄_ref,best)
14:         IF r̄_ref,global ≠ NULL THEN
15:             GLOBAL FOLLOWING ← ACTIVE
16:         END IF
17:     END IF
18:     REPEAT
19:         ExpandTree()
20:     UNTIL TIME LIMIT Δt - δ IS REACHED
21:     IF GLOBAL FOLLOWING IS ACTIVE THEN
22:         r̄_ref,global[1] ← x̄(t₀+Δt); x̄_reprop,global ← TrajPredictor(r̄_ref,global)   ▷ REPROPAGATE FROM PREDICTED VEHICLE STATE
23:         IF x̄_reprop,global ∈ X_free(t) THEN
24:             SEND r̄_ref,global TO TRAJECTORY FOLLOWER FOR EXECUTION
25:             CONTINUE
26:         ELSE
27:             GLOBAL FOLLOWING ← INACTIVE
28:         END IF
29:     END IF
30:     SORT PREDICTED TRAJECTORIES IN TREE
31:     FOR EACH REFERENCE PATH r̄_ref IN THE TREE, IN SORTED ORDER DO
32:         r̄_ref[1] ← x̄(t₀+Δt); x̄_reprop ← TrajPredictor(r̄_ref)      ▷ REPROPAGATE FROM VEHICLE STATE
33:         IF x̄_reprop ∈ X_free(t) THEN
34:             r̄_ref,best ← r̄_ref
35:             r̄_ref,global ← GlobalFollowing(r̄_ref,best)
36:             IF r̄_ref,global ≠ NULL THEN
37:                 r̄_ref,global[1] ← x̄(t₀+Δt); x̄_reprop,global ← TrajPredictor(r̄_ref,global)   ▷ REPROPAGATE FROM PREDICTED VEHICLE STATE
38:                 IF x̄_reprop,global ∈ X_free(t) THEN
39:                     GLOBAL FOLLOWING ← ACTIVE
40:                     SEND r̄_ref,global TO TRAJECTORY FOLLOWER FOR EXECUTION
41:                     goto LINE 2
42:                 END IF
43:             END IF
44:             SEND r̄_ref,best TO TRAJECTORY FOLLOWER FOR EXECUTION
45:             goto LINE 2
46:         END IF
47:     END FOR
48:     NO PLAN: PERFORM EMERGENCY ACTION
49: UNTIL THE VEHICLE REACHES THE GOAL REGION
```

FIG. 19

ALGORITHM 7 $\vec{r}_{ref,global}$ = GlobalFollowing($\vec{r}_{ref}$)

1: $\vec{r}_{ref,global} \leftarrow [\vec{r}_{ref}, local\_goal, global\_points]$  ▷ APPEND LOCAL GOAL AND REMAINING GLOBAL WAYPOINTS TO BEST REFERENCE PATH
2: $\hat{x}_{global} \leftarrow TrajPredictor(\vec{r}_{ref,global})$  ▷ SMOOTH GLOBAL REFERENCE PATH
3: IF $\hat{x}_{reprop,global} \notin X_{free}$ THEN
4: $\quad \vec{r}_{ref,global} \leftarrow NULL$
5: END IF
6: RETURN $\vec{r}_{ref,global}$

FIG. 20

ALGORITHM 8 SAMPLE NODE GROUND-SPEED CALCULATION ALGORITHM

1: <u>PROCEDURE</u> $v_{sample}$ = <u>CalculateSampleSpeed</u>($\rho_{sample}, \rho_{goal}, \rho_{parent}, v_{parent}, v_{goal}$)
2:
3:      $v_{max} \leftarrow$ MAX(MaxAllowedVel, $v_{parent}, v_{goal}$)
4:      $v_{min} \leftarrow$ MIN(MinAllowedVel, $v_{parent}, v_{goal}$)
5:      <u>IF</u> $v_{parent} < v_{goal}$ <u>THEN</u>
6:          $\alpha_{max} \leftarrow$ MaxAllowedAccel
7:      <u>ELSE</u>
8:          $\alpha_{max} \leftarrow -1 \times$ MaxAllowedAccel
9:      <u>END IF</u>
10: FORWARD PASS:
11:      $D \leftarrow \| \rho_{parent} - \rho_{sample} \|$
12:      $v_{forward} = \sqrt{\max(0, v^2_{parent} + 2D\alpha_{max})}$
13:      $v_{forward} =$ CLIP($v_{forward}, v_{min}, v_{max}$)
14: BACKWARD PASS:
15:      $D \leftarrow \| \rho_{goal} - \rho_{sample} \|$
16:      $v_{backward} = \sqrt{\max(0, v^2_{goal} + 2D\alpha_{max})}$
17:      $v_{backward} =$ CLIP($v_{backward}, v_{min}, v_{max}$)
18: TAKE THE MINIMUM OF FORWARD AND BACKWARD:
19:      $v_{sample} =$ MIN($v_{forward}, v_{backward}$)
20: <u>END PROCEDURE</u>

FIG. 21

ABSTRACT

AUTONOMOUS AIRCRAFT LOCAL PLANNING TO AVOID OBSTRUCTIONS

BACKGROUND

Exemplary embodiments relate to the art of rotary or fixed wing aircraft, and more particularly, to autonomous aircraft local planning to avoid obstructions.

BRIEF DESCRIPTION

According to one or more embodiments, a method for autonomous obstacle avoidance is provided. The method includes controlling a vehicle on a route to a destination, the route being a three-dimensional route. The method includes determining an obstruction on the route, autonomously determining a local route comprising alternate points to avoid the obstruction, and autonomously converging the local route back to the route in response to avoiding the obstruction.

In addition to one or more of the features described above or below, or as an alternative, further embodiments could include wherein the route is planned in advance prior to determining the local route to avoid the obstruction.

In addition to one or more of the features described above or below, or as an alternative, further embodiments could include wherein the route comprises points.

In addition to one or more of the features described above or below, or as an alternative, further embodiments could include wherein the local route avoids one or more of the points on the route by following the alternate points.

In addition to one or more of the features described above or below, or as an alternative, further embodiments could include wherein the route comprises segments.

In addition to one or more of the features described above or below, or as an alternative, further embodiments could include wherein the local route avoids one or more of the segments.

In addition to one or more of the features described above or below, or as an alternative, further embodiments could include wherein converging the local route back to the route in response to avoiding the obstruction comprises locking back to one or more segments of the route after determining the local route to avoid the obstruction.

In addition to one or more of the features described above or below, or as an alternative, further embodiments could include wherein converging the local route back to the route in response to avoiding the obstruction comprises determining that a different route other than the route is available to the destination after determining the local route to avoid the obstruction.

In addition to one or more of the features described above or below, or as an alternative, further embodiments could include wherein converging the local route back to the route in response to avoiding the obstruction further comprises determining to reject the different route to the destination and instead return back to the route.

In addition to one or more of the features described above or below, or as an alternative, further embodiments could include wherein the vehicle is an aircraft.

According to one or more embodiments, a system for autonomous obstacle avoidance is provided. The system includes a processor and memory coupled to the processor and comprising computer-executable instructions that, when executed by the processor, cause the processor to perform operations. The operations includes controlling a vehicle on a route to a destination, the route being a three-dimensional route. The operations include determining an obstruction on the route, determining a local route comprising alternate points to avoid the obstruction, and converging the local route back to the route in response to avoiding the obstruction.

BRIEF DESCRIPTION OF THE DRAWINGS

The following descriptions should not be considered limiting in any way. With reference to the accompanying drawings, like elements are numbered alike:

FIG. 7 depicts example Algorithm 1 in accordance with one or more embodiments;

FIG. 8 depicts Table 1 in accordance with one or more embodiments;

FIG. 9 depicts example Algorithm 2 in accordance with one or more embodiments;

FIG. 10 is a graph of example paths in accordance with one or more embodiments;

FIG. 15 depicts example Algorithm 4 in accordance with one or more embodiments;

FIG. 16 depicts example Algorithm 5 in accordance with one or more embodiments;

FIG. 19 depicts example Algorithm 6 in accordance with one or more embodiments;

FIG. 20 depicts example Algorithm 7 in accordance with one or more embodiments; and FIG. 21 depicts example Algorithm 8 in accordance with one or more embodiments.

DETAILED DESCRIPTION

A detailed description of one or more embodiments of the disclosed apparatuses are presented herein by way of exemplification and not limitation with reference to the Figures.

One or more embodiments provide an autonomous local motion planner (which may include one or more algorithms) that commands a flight control system of an aircraft to follow a desired global path while avoiding obstacles and terrain.

Figure 1:
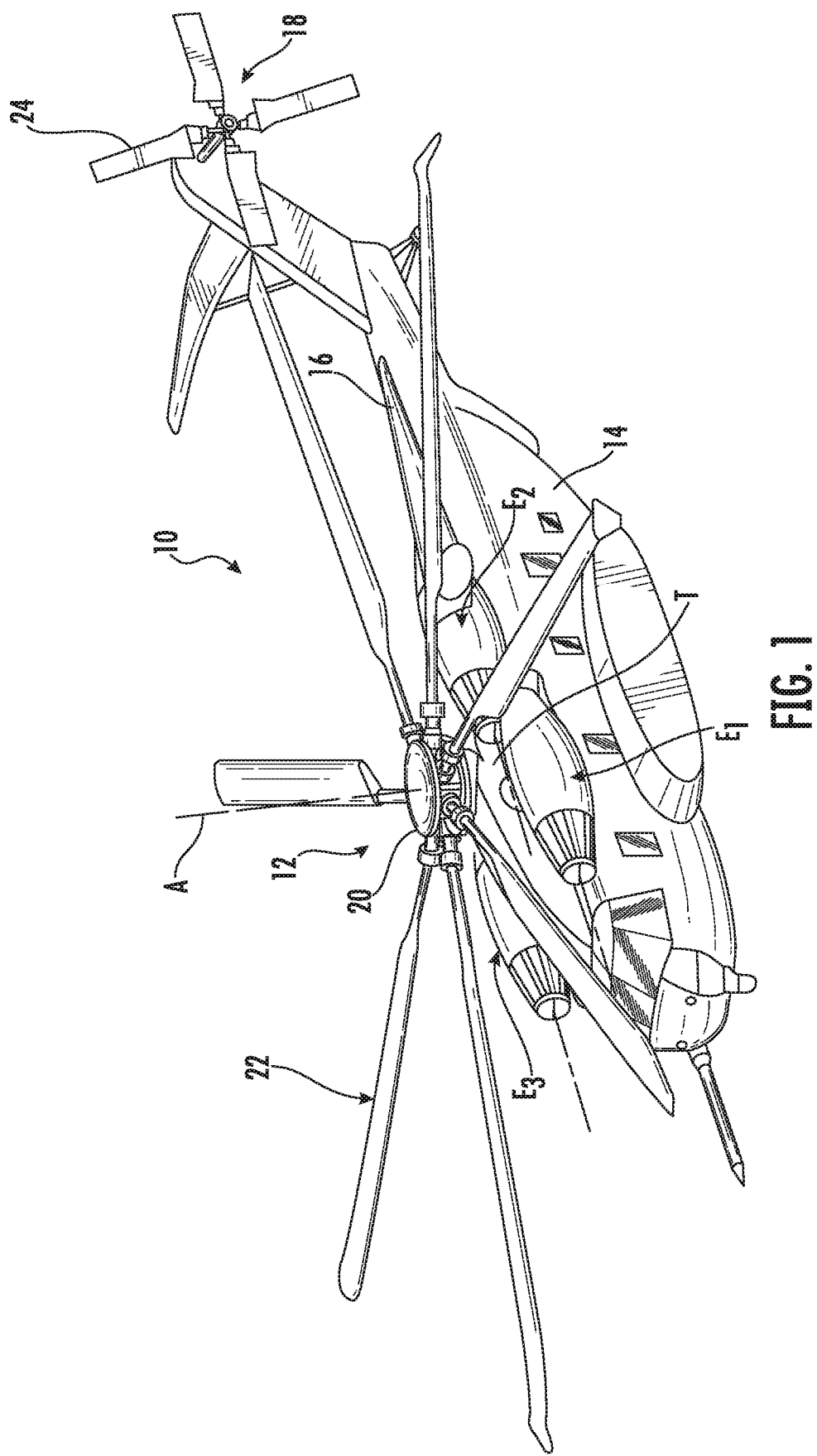
FIG. 1 depicts a rotary wing aircraft in accordance with one or more embodiments.

FIG. 1 schematically illustrates an exemplary vertical takeoff and landing (VTOL) rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
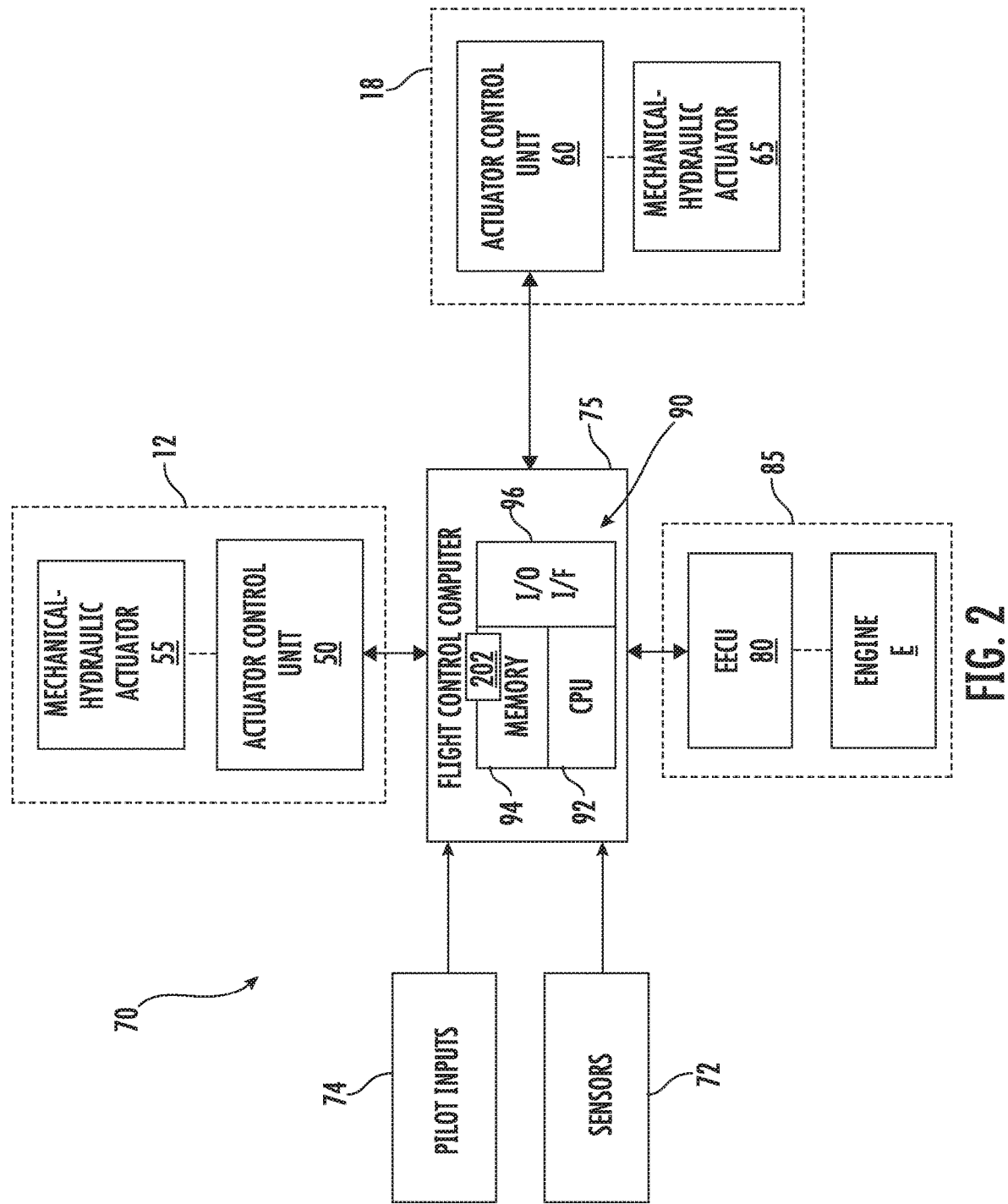
FIG. 2 depicts a schematic diagram of a flight control system in accordance with one or more embodiments.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10. The pilots inputs 74 can provide autonomous control of the aircraft 10 without human intervention and/or enable the aircraft 10 to be an optionally piloted vehicle.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

The FCC 75 also includes an autonomous local motion planner module 202. The local motion planner module 202 may be in or coupled to memory 94. The autonomous local motion planner module 202 can be implemented as instructions stored on a computer-readable storage medium, as hardware modules, as special-purpose hardware (e.g., application specific hardware, Application Specific Integrated Circuits (ASICs), as embedded controllers, hardwired circuitry, etc.), or as some combination or combinations of these. In examples, the module described herein can be a combination of hardware and programming. The programming can be processor executable instructions stored on a tangible memory, and the hardware can include processing circuitry 92 for executing those instructions. Thus a system memory can store program instructions that when executed by processing circuitry 92 implement the module described herein. Alternatively or additionally, the FCC 75 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 3:
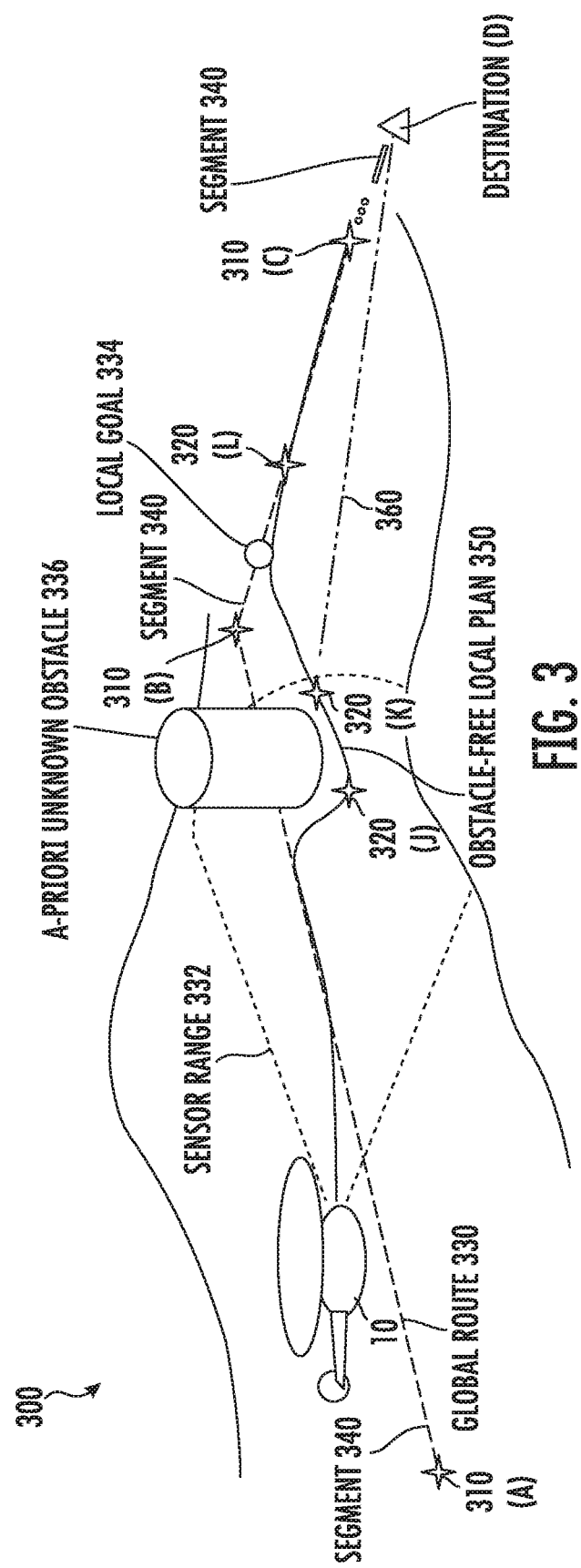
FIG. 3 depicts an example scenario utilizing a local motion planner module in accordance with one or more embodiments.
Figure 4:
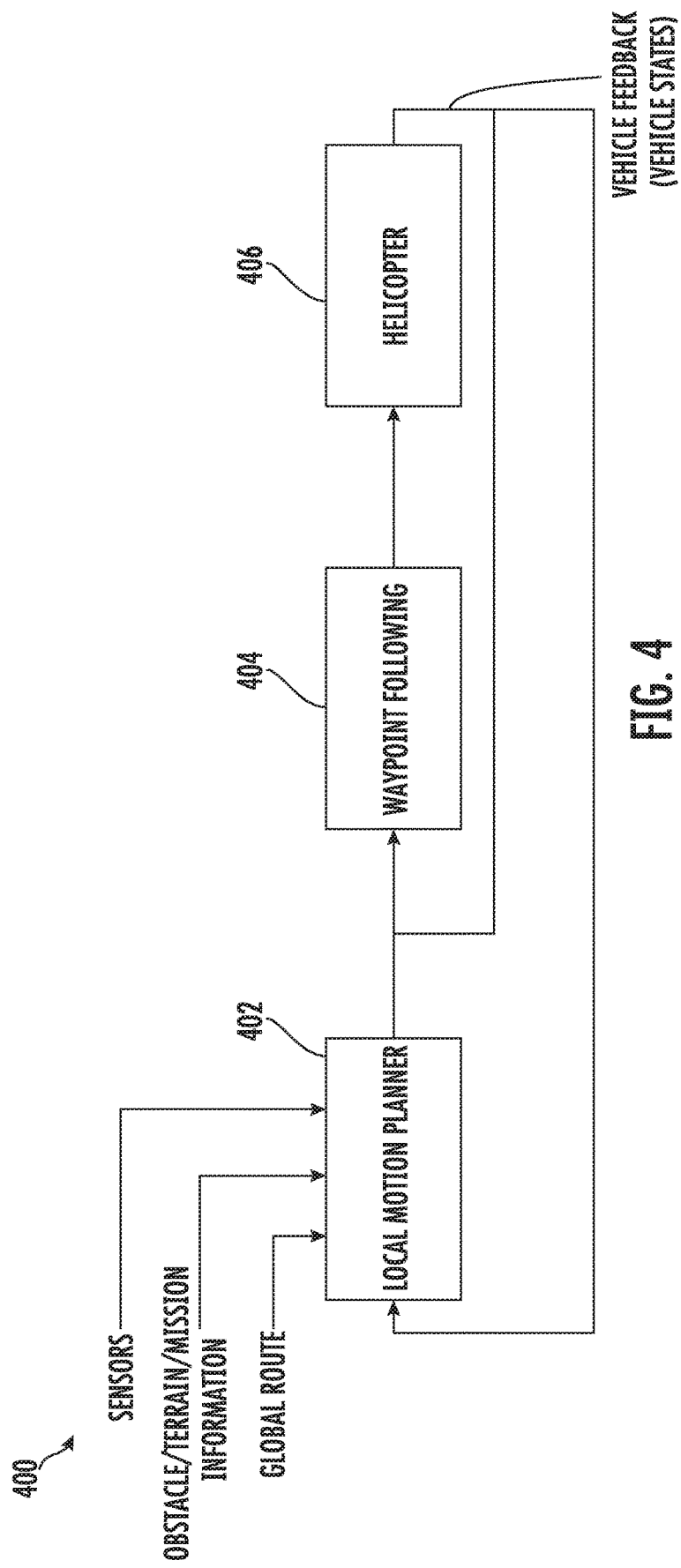
FIG. 4 illustrates a block diagram utilizing the local motion planner module in which a flight control system autonomously controls the aircraft in accordance with one or more embodiments.

The local motion planner module 202 is configured to autonomously command the FCC 75 of the aircraft 10 to follow a desired global path while avoiding obstacles, terrain, etc., which can be generally referred to as an obstruction. FIG. 3 illustrates an example scenario 300 using the local motion planner module 202 according to one or more embodiments. FIG. 4 illustrates a block diagram 400 using the local motion planner module 202 in which the flight control system 70 autonomously controls the aircraft 10 according to one or more embodiments.

Referring to example scenario 300 in FIG. 3, the flight control system 70 is configured to autonomously control the aircraft 10 to follow a global route 330, which leads to a destination. The global route 330 is a three-dimensional (3D) route, for example, having directions in an x, y, z coordinate system. The global route 330 can include waypoints 330 and (flight) segments 340 between the waypoints 310. The global route 330 is a preplanned course or path for the flight control system 70 to autonomously follow and fly along. The global route 330 can be preplanned and based on map information such as obstacle information, terrain information, no-fly zone information, etc. Also, the global route 330 can be preplanned and based on mission information, such as enemy troop location, friendly troop location, radar positions, etc.

The local motion planner module 202 chooses a moving local goal 334 on the global route 330 and maintains the local goal 334 at a predefined distance beyond the sensor horizon (i.e., outside the sensor range 332). The moving local goal 334 advances along the global route 330 as the aircraft 10 moves. The local motion planner module 202 is configured to follow the local goal 334 moving along global route 330 such that the aircraft 10 is autonomously controlled to fly to each of the waypoints 310, designated as A, B, and C, connecting the segments 340, thereby controlling the aircraft 10 to ultimately reaches the destination. The destination can be a waypoint 310 as well (e.g., D). To prevent the local motion planner module 202 from changing the best path, which is the global route 330, the local motion planner module 202 implements a global following lock strategy. For the global following lock strategy, once the best and safest global route 330 (path) to the destination (goal) was predetermined as the global route 330, the global route 330 is locked and is only unlocked when the global route 330 is obstructed. In a situation where there is no obstruction on the global route 330, the local motion planner module 202 is configured to follow the waypoints 310 (e.g., A, B, C) along the global route 330 such that the aircraft 10 is controlled accordingly.

Continuing the example scenario 300 depicted in FIG. 3, one or more sensors 72 of the aircraft 10 may detect one or more obstructions 336 on the preplanned global route 330. The sensors 72 can include radars, Light Detection and Ranging (LIDAR), Laser Detection And Ranging (LADAR), cameras, etc., and the sensors 72 have a predetermined sensor range 332 from the aircraft 10. The predetermined sensor range 332 from the aircraft 10 could be X kilometers (km), and the local goal is advanced Y km beyond the edge of the predetermined sensor range 332. In the example scenario 300, the local motion planner module 202 of the flight control computer 75 receives the sensor data of sensors 72 and identifies the obstruction 336 at block 402 in FIG. 4. The local motion planner module 202 can receive additional information including the global route 330, obstacle information, terrain information, etc. The obstruction 336 was not previously identified on the preplanned global route 330, such that the local motion planner module 202 was unaware of the obstruction 336 prior to detection. The obstruction 336 can include physical obstacles and mission obstacles which were not part of the preplanned global route 330. Examples of the obstruction 336 can include terrain (e.g., a mountain, hill, body of water, tree line, etc.), man-made obstacles (e.g., towers, power lines, buildings, etc.), enemy troop locations, no-fly zones, etc.

In response to the local motion planner module 202 detecting the obstruction 336 (which is an a priori unknown obstacle), the local motion planner module 202 is configured to generate new local waypoints 320 for an obstacle free local route 350 to avoid the obstruction 336. Before sending local waypoints 320 for execution, the local motion planner module 202 internally ensures that the new local route 350 is safe. For example, the local motion planner module 202 parses the map data (including terrain and obstacle information), mission data (including enemy troop location, predesignated areas to avoid, etc.), and sensor data of sensors 72, etc., to check and ensure that the predicted path of local route 350 is safe. Particularly, the location motion planner module 202 determines whether the obstacle free local route 350 would be affected by and/or fly through a terrain obstacle, man-made obstacle, mission obstacle, etc. If the predicted path of local route 350 is not safe, the local motion planner module 202 is configured to generate a predicted path of local route with new waypoints. If the predicted path of local route 350 is determined to be safe, the predicted path of local route 350 including new waypoints 320 (e.g., J, K, L) are passed on/approved for waypoint following (by the flight control system 70) such that the aircraft 10 can be autonomously controlled at block 404. The local motion planner module 202 is configured to unlock the global route 330 such that the deviation from the global route 330 can occur. The local motion planner module 202 is configured to operate in a three-dimensional (3D) space such that in some cases the predicted path of local route 350 can be to fly above the obstruction 336, although FIG. 3 illustrates an example of flying around the obstruction 336. Further regard local motion planner module 202, within the local motion planner module 202 there is a trajectory predictor that contains the model of the waypoint following controller. The waypoints are sent to the predictor and the predictor predicts the trajectory through the waypoints. The predicted trajectory is shown local route 350 in FIG. 3. If the predicted trajectory is not free, the local motion planner module 202 can drop the waypoints and pick different ones until the free predicted trajectory is obtained.

Also, the local motion planner module 202 is configured to ensure that the aircraft 10 returns back to the preplanned global route 330 after avoiding the obstruction 336. The local motion planner module 202 is continuously seeking to reach the local goal 334. For example, the predicted path for local route 350 is generated and monitored by the local motion planner module 202 to stay as close as possible to the global route 330 and to converge back with global route 330 as quickly as possible. Additionally, the local motion planner module 202 is configured to control the aircraft 10 to follow the preplanned speed of the waypoints 310 when traveling on the predicted path of local route 350 with new waypoints 320. Each of the waypoints 310 (e.g., A, B, C) have a predefined speed which could be different for some and the same speed (or nearly the same speed for others). When controlling the aircraft 10 on the predicted path of local route 350, the local motion planner module 202 is configured to reach predicted path of local waypoint 320 (e.g., J) with the same (or about the same) speed (e.g., X knots) as preplanned for global waypoint 310 (e.g., A). Particularly, the speed of the new waypoints are determined based on acceleration/deceleration capability of the vehicle (e.g., aircraft 10). Similarly, the local motion planner module 202 is configured to reach new local waypoint 320 (e.g., K) with the same (or about the same) speed (e.g., Y knots) as preplanned for global waypoint 310 (e.g., B). Analogously, when converging back on to the global route 330, the local motion planner module 202 is configured to reach local waypoint 320 (e.g., L) with the same (or about the same) speed (e.g., Z knots) as preplanned for global waypoint 310 (e.g., C).

The local motion planner module 202 is configured to converge back to the preplanned global route 330 after avoiding the obstruction 336, even if the local motion planner module 202 finds an alternate route 360 to the destination. For example, when generating the predicted local route 350 on the fly, the local motion planner module 202 may determine that alternate route 360 is a shorter, faster, and/or more direct route to the destination than the preplanned global route 330. However, because the local motion planner module 202 is designed to lock back on to the global route 330 immediately after avoiding the obstruction 336, the local motion planner module 202 returns to the global route 330 which has been previously vetted. For example, the local motion planner module 202 is configured to converge back on a segment 340 and/or waypoint 310 of the global route 330 within a predefined distance of avoiding the obstruction 336; this ensures that the aircraft 10 returns to the global route 330 as quickly as possible and/or within a shortest distance as possible because the global route 330 may contain mission critical elements that should be met. Returning back to the global route 330 is achieved via the local goal 334 and the global locking strategy; the closer the local goal 334 the faster the aircraft 10 converges to global route 330. However, if the local goal is too close, then the aircraft is not looking ahead enough for obstacle avoidance, and accordingly, there is a trade-off.

Referring to FIG. 4, the flight control system 70 (via local motion planner module 202) controls the aircraft 10 to fly along the predicted path of local route 350 and then converge back to the global route 330 at block 406. Vehicle feedback is provided to the local motion planner module 202 to ensure that the aircraft 10 is properly following the predicted path of local route 350, and eventually the global route 330. The vehicle feedback includes vehicle states and vehicle orientation, which are utilized by the local motion planner module 202 to alter/correct errors in the control of the aircraft 10. For example, cross winds may cause the aircraft 10 to deviate from the commanded path of the local route 350, and the local motion planner module 202 is configured to start planning from where the error or deviation occurred to command the aircraft 10 back to the local route 360.

Further details regarding the local motion planner module 202 are provided below, which can be executed and performed by FCC 75 of the flight control system 70. Although specific examples and implementations are discussed below, these are provided for explanation purposes and not limitation. Additionally, sections/headings have been utilized for ease of understanding and not limitation. Sections 1-7 are discussed below.

1 Acronyms and Setup

The following acronyms are provided: Rapidly exploring Random Tree (RRT); Closed-Loop Rapidly exploring Random Tree (CL-RRT); Closed-Loop Rapidly exploring Random Tree Air Vehicle (CL-RRTAV); Flight Augmentation and Cueing System (level A partition) (FACSa); Primary Flight Control System (PFCS); North-East-Down coordinate frame (NED-frame); East-North-Up coordinate frame (ENU-frame); Earth Centered Earth Fixed coordinate frame (ECEF-frame); LIght Detection and Ranging (LIDAR); Digital Terrain Elevation Data (DTED); and Autonomous Mission Manager (AMM).

A motion planning system is responsible for computing safe and dynamically feasible motion plans from a current vehicle state to a goal location. This is accomplished by providing constraints on known, unsafe airspace, such as obstacles, and constraints on feasible motion from a given vehicle model. Oftentimes, a motion planner is also presented with an objective function, such as minimization of travel time (or distance), distance from hazardous airspace, or proximity to a desired route. In a typical setup, the output of a motion planner is passed to a local feedback control layer. In turn, the feedback controller generates an input signal to regulate the vehicle to follow a given motion plan. In accordance with one or more embodiments, the disclosed approach makes use of a hierarchical motion planning system including both a higher layer Global Planner and lower layer Local Planner.

The Global Planner (computer-executable instructions of FCC 75) is responsible for generating a Global Plan to carry out a desired mission. It contains a sequence of waypoints, each of which specifies a geographic coordinate in three-dimensional airspace and a desired speed (either ground or air) at which to approach. It is updated throughout the course of a mission when necessary, such as in the event there is a change in the mission objective or known safe airspace.

The Local Planner (i.e., the local motion planner module 202 of FCC 75) is responsible for providing a higher fidelity plan at higher frequencies for an aerial vehicle to follow. High frequency updates are utilized to ensure vehicle safety when traveling at high speeds with limited sensing capability. The Local Planner also has the additional responsibility to provide plans that stay near the Global Plan.

2 Definitions and Preliminaries

Tree. Tree is a directed graph, with no cycles, in which all nodes have several outgoing edges, to each of which correspond another node called a child. A child node can have several children. All nodes, excluding the root of the tree, have one and only one incoming edge, which comes from the parent. The root of the tree has no parent.

Global Planner. The global planner is responsible for providing the target location and groundspeed.

Waypoint. The global planner provides the target location via waypoints. Each waypoint contains the latitude, longitude, and altitude of the desired point along with its groundspeed. The latitude and longitude are converted to NED-frame position within the local planner with respect to the aircraft initial position.

Route or Global Path. A route consists of a sequence of waypoints. Global path or route can be used interchangeably in this document.

Reference Path. A reference path is a sequence of waypoints that the local-planner uses internally to predict the trajectory of the closed-loop system. At the end of each planning cycle, the local-planner sends the best reference path to the closed-loop controller for execution.

Predicted Trajectory. When a reference path or series of waypoints are passed through the predictor, the predictor generates a time history of predicted vehicle states, called predicted trajectory.

Data Stored in CL-RRT Tree. In the CL-RRT algorithm, the edges of the tree represent the reference path. As such, the NED-frame position and groundspeed of each segment of the reference path are stored in the tree nodes. Each edge of the tree stores the travel cost between the two nodes.

Coordinate System. A local-level ENU-frame is used for local planning.

3 Environment Representation

3.1 Region Cost Map

The Region Cost Map is the Local Planner's interface to the region/environment and it handles all obstacle checking for the Local Planner. The Region Cost Map abstracts away specific collision checking and environment information extraction algorithms from the Local Planner so the Local Planner can remain flexible and use any collision checking algorithm that is written to conform to the Region Cost Map interface. The Region Cost Map allows the Local Planner to look up the height of the environment at specific ENU points and to generate the cost of 3D segments due to the current environment.

3.1.1 Environment Characterizations and Buffers

The inventors include various buffer areas around the obstacles to take into account trajectory tracking error as well other safety factors provided by, for example, the Federal Aviation Administration (FAA). In one or more embodiments, the Local Planner should be able to fly in and out of buffers if necessary because it is common to cut the corner of a buffer or fly directly into the buffer in the event of emergency situations. The capability of finer characterization of the environment (not just OCCUPIED or FREE) was added to allow the Local Planner to distinguish between OCCUPIED, BUFFER, and EXTRA BUFFER areas and make decisions accordingly.

In one or more embodiments, the Region Cost Map defines 5 characterizations (RegionStates) of the world space. These characterizations are ordered by increasing cost:

1) FREE: Free space
2) EXTRA BUFFER: Extra buffer is that which the Local Planner uses during tree growth only to account for tracking error. This buffer is generally much smaller than BUFFER and is applied on top of BUFFER. BUFFER lies between EXTRA BUFFER and OCCUPIED areas so EXTRA BUFFER acts as an outer buffer with higher preference (lower cost) than BUFFER.
3) BUFFER: This is the desired buffer/clearance to stay away from obstacles and terrain. This is generally set according to Federal Aviation Administration (FAA) restrictions and regulations.
4) UNKNOWN: Areas that have not been observed by LIDAR yet.

UNKNOWN is a higher cost than BUFFER because it has not been seen by LIDAR and thus could represent dangerous areas.

5) OCCUPIED: Space occupied by obstacles

These characterizations are ordered to represent cost ranked from lowest cost characterization to highest cost characterization. FREE represents the lowest cost area, followed by, EXTRA BUFFER (outer buffer), then BUFFER (inner buffer), and so on. OCCUPIED is always the highest cost area. The RegionStates provide extra information to the Local Planner because all point and segment lookups (collision checks) include information about the highest RegionState crossed by the segment or point.

3.2 Cost Comparison and Sorting Strategy

Due to the addition of environment characterizations, a more complicated cost representation and sorting strategy was designed to account for the characterizations. Cost is represented by the Cost class which contains as a member, a RegionCost class instance that describes the region/environment cost. The Cost class also contains a DistanceCost field and functions to obtain the total cost of the object as a double and to compare Cost instances. DistanceCost is used to store the length of an edge using the length of the Predicted trajectory for the edge, and this length is calculated by aggregating Euclidean distance between pairs of points in predicted trajectory. The RegionCost class contains a RegionState field which represents the highest crossed environment characterization by a segment, and a double value that can be used to represent more complicated preferences, such as distance to obstacles.

The cost sorting strategy is designed to place a higher emphasis on RegionCost compared to DistanceCost and this was accomplished by using a step cost approach. The step cost is designed to first compare the RegionCosts of two Cost instances and only compare DistanceCosts if the RegionCosts are equal. If the twoRegionCosts are equal, then the Cost instance with lower DistanceCost is returned as being less than the other instance. If the RegionCosts are not equal, the Cost instance with lower RegionCost is returned as being less than the other instance, and in this case, the DistanceCost is not factored into the comparison at all.

Algorithm 1 shows the logic of the "less than" comparison of cost instances as depicted in FIG. 7. As depicted in FIG. 8, Table 1 shows the sorted output of a list of Cost instances. It is evident that the Costs are sorted first by RegionState and then by DistanceCost when the RegionStates are equal. The list is sorted from lowest cost to highest cost. The RegionCost double value is set to 0 for all non-occupied Costs and infinity for all occupied Costs. This double value is added to the DistanceCost value to calculate TotalCost.

4 CL-RRTAV Motion Planning Algorithm

The Closed-Loop RRT Air Vehicle (CL-RRTAV) algorithm finds feasible trajectories for aircraft through the environment using a method described in Section 4.1. CL-RRTAV. This is an extension of the CL-RRT algorithm that was developed for autonomous driving by Kuwata, Y., Teo, J., Fiore, G., Karaman, S., Frazzoli, E., & How, J. P. (2009). Real-time motion planning with applications to autonomous urban driving. IEEE Transactions on Control Systems Technology, 17 (5), 1105-1118.

Planning real-time in a dynamic environment requires that the planning algorithm be run continuously and new trajectories chosen according to new constraints. The online management of the planner is described in Section 4.7.

4.1 CL-RRTAV Tree Expansion

The CL-RRTAV algorithm finds trajectories in a continuous section of 3D space $\chi$. All points in this space in which the vehicle can operate (i.e., not obstructed by the ground or other obstacles) are contained in the set $\chi_{free} \subseteq \chi$.

As a member of the RRT family of algorithms, CL-RRTAV builds a tree of trajectories contained in $X_{free}$, the best of which is chosen for execution by the vehicle. The tree $\mathcal{T} = \{q_1, q_2, \ldots, q_n\}$, $n \geq 1$ consists of a set of nodes q. Each node q contains several fields: state, cost, cost2go, parent.

The tree is initialized with a root node $q_1 = q_{root}$. The state of the root, $q_{root}$.state=$\vec{x}_{root}$=[n, e, u, ṅ, ė, u̇, φ, φ̇, ψ, ψ̇], represents the full vehicle state at the beginning of each trajectory, where φ denotes bank angle, φ̇ bank angle rate, heading, n, e, u are north, east, up, and ψ is heading rate.

The cost field for a node q holds the total cost to travel from the root node to q. This cost may contain distanceCost and regionCost as described in Section 3. The cost of the root node is zero (i.e. $q_{root}$.cost=0). The assignment of cost-to-go for each node is discussed in Section 4. Each node $q \in \mathcal{T}$ |q≠$q_{root}$ has exactly one parent node such that q.parent=$q_{parent} \in \mathcal{T}$.

A reference path in the tree consists of an ordered set of nodes, $\vec{r}_{ref} = \{q_1, \ldots, q_m\}$, $m \geq 2 | q_{i+1}$.parent( )=$q_i \forall i < m$ where $q_1 = q_{root}$. Each reference path in the tree has an associated predicted vehicle trajectory $\hat{\vec{x}} \in \chi_{free}$ that is calculated by sending the reference path to the predictor described in Section 6, $\hat{\vec{x}}$=Trajpredictor($\vec{r}_{ref}$).

Algorithm 2 shows the Expand Tree procedure, which is the example method of adding nodes to the tree, as depicted in FIG. 9. After tree growth, the best single reference path $\vec{r}_{ref,best}$ in the tree—and associated feasible predicted trajectory $\hat{\vec{x}}_{best}$=Trajpredictor($\vec{r}_{ref,best}$) is chosen for execution. In line 1 of Algorithm 2, forming the sampled node $q_s$ starts by taking a random sample $p_s=[e_s, n_s, u_s] \in \chi_{free}$ from the free space of the 3D environment. The sampling distribution is specialized for the planning problem. Using a tuned sampling procedure, rather than sampling uniformly within the environment bounds, allows for convergence to a near-optimal solution in fewer iterations of the Expand Tree procedure. The implemented sampling method is detailed in Section 4.4. Note that the sampled point s does not include a sampled velocity $v_s$. Rather, the velocity of the sampled point is assigned deterministically according to the procedure in Section 5. The sampled node $q_s=[p_s, v_s]$ combines the sampled position and assigned velocity.

Choose Parent. A modified version of the ChooseParent method from RRT* is used to add the sampled node into the tree. Multiple possible parents for the sampled node are considered in order to increase the number of samples that are added into the tree and improve trajectory quality inside the tree. Lines 2-14 in Algorithm 2 explain this procedure. First, in line 2, all the nodes in the tree are ranked from best to worst candidate parents based on chosen heuristics. The inventors form a distanceCost from the length of a Dubins Path from the candidate parent to the sample. This cost can be calculated analytically as described in the section below.

4.2 3D Analytic Dubins Cost

This section discusses computing the length of a path from a sample point to its parent candidates. The simplest approach would be to use Euclidean distance between the sample and the candidate parents. However, the Euclidean distance does not take into account the fact that candidate parents might have different headings. In other words, if a parent's heading is towards the sample point, its distance to the sample point is shorter than a parent whose heading is opposite side of the sample. For this reason, the Dubins distance cost is used from the candidate parents to the sample. A special kind of Dubins distance is used in which the heading at the end point is free (e.g., not specified) and whatever heading that provides minimum distance is used for the end point. This is because the sample points do not yet have a heading in the tree. FIG. 10 illustrates an example of Dubins paths between a parent candidate at (0,0) with 9 different headings and a sample point at (500,0). In FIG. 10, the final heading at the sample point is determined by the path that provides the shortest path.

Numerically calculating the length of the Dubins path in FIG. 10 is computationally intense especially if it has to be done for thousands of sample points. In the reference Kuwata et al, 2009, formulas are provided for analytically calculating the Dubins path in 2-Dimensional plane. The inventors will first summarize the analytic formulas (in Kuwata et al. 2009) and then provide a method to generalize it for three-dimensions.

There is a candidate parent node $q_{candidate}$ and a sampled node $q_s$ which are considered. The nodes are translated and rotated such that $p_{q_{candidate}}=[0,0,0]$ and the heading of $q_{candidate}$ is along the positive east-axis. The sampled node is denoted in the translated and rotated frame as $\tilde{q}_s$ with position $p_{\tilde{q}_s}=[e_{\tilde{q}_s}, |n_{\tilde{q}_s}|, u_{\tilde{q}_s}]$. The inventors take the absolute value of the $n_{\tilde{q}_s}$ term because the lengths to positions $[e_{\tilde{q}_s}, n_{\tilde{q}_s}, u_{e_{\tilde{q}_s}}]$ and $[e_{\tilde{q}_s}, -n_{\tilde{q}_s}, u_{\tilde{q}_s}]$ are equivalent.

The assumed minimum turn radius of the vehicle p (which is below) is derived from the velocities of $q_{candidate}$ and $q_s$, and the maximum bank angle of the vehicle $\phi_{max}$.

$$\rho = \frac{\max(v_{q_{candidate}}, v_{q_s})^2}{9.81 * \tan(\phi_{max})} \quad (1)$$

Once the minimum turn radius is obtained, the length of the Dubins path is calculated in one of two ways, depending on whether $\tilde{q}_s$ is within the vehicle's turn radius. The inventors define the space that contains the left and right turn circles as $ID_p = \{z \in \mathbb{R}^2 : \|z-[0, \rho]\| < \rho\}$. The minimum length $L_{2D}(\tilde{q}_s)$ is given by $$L_{2D}(\tilde{q}_s) = \begin{cases} f(\tilde{q}_s), & \text{for } \tilde{q} \notin \mathcal{D}_p(2) \\ g(\tilde{q}_s), & \text{otherwise} \end{cases} \quad (2)$$

$$f(\tilde{q}_s) = \sqrt{d_c^2(\tilde{q}_s) - \rho^2} + \rho\left(\theta_c(\tilde{q}_s) - \cos^{-1}\frac{\rho}{d_c(\tilde{q}_s)}\right) \quad (3)$$

$$g(\tilde{q}_s) = \rho\left(\alpha(\tilde{q}_s) + \sin^{-1}\frac{x}{d_f(\tilde{q}_s)} - \sin^{-1}\frac{\rho \sin(\alpha(\tilde{q}_s))}{d_f(\tilde{q}_s)}\right) \quad (4)$$

where, $$d_c(\tilde{q}_s) = \sqrt{e_{\tilde{q}_s}^2 + (|n_{\tilde{q}_s}| - \rho)^2} \quad (5)$$

$$\theta_c(\tilde{q}_s) = \mathrm{atan2}(e_{\tilde{q}_s}, \rho - |n_{\tilde{q}_s}|) \quad (6)$$

$$d_f(\tilde{q}_s) = \sqrt{e_{\tilde{q}_s}^2 + (|n_{\tilde{q}_s}| + \rho)^2} \quad (7)$$

$$\alpha(\tilde{q}_s) = 2\pi - \cos^{-1}\left(\frac{5\rho^2 - d_f(\tilde{q}_s^2)}{4\rho^2}\right) \quad (8)$$

The atan2 function is the 4 quadrant inverse tangent function with an output range set to $[0, 2\pi)$.

As mentioned earlier, $L_{2D}(\tilde{q}_s)$ is the 2D distance and is only valid if the sample is in the same height of parent node, i.e. $u_{\tilde{q}_s}=0$. If $u_{\tilde{q}_s}$ is not zero the inventors first check whether the altitude gain between the sample and the parent can be achieved by flying the 2D Dubins path with constant climb (or descend) angle that is less than the maximum allowable climb (or descend) angle $\pm \gamma_{max}$. In other words, the inventors check whether the condition below holds (note that it is assumed the parent is at height zero for simplicity)

$$-\gamma_{max} \leq \gamma^* = \tan^{-1}\left(\frac{u_{\tilde{q}_s}}{L_{2D}(\tilde{q}_s)}\right) \leq \gamma_{max} \quad (9)$$

If the condition in Equation (9) is satisfied, then it is possible to reach the desired altitude by flying the 2D path with constant climb (descend) angle of $\pm\gamma^*$. The length of the 3D Dubins path is then calculated via $$L_{3D}(\tilde{q}_s) = \frac{L_{2D}(\tilde{q}_s)}{\cos\gamma^*} \quad (10)$$

Figure 11:
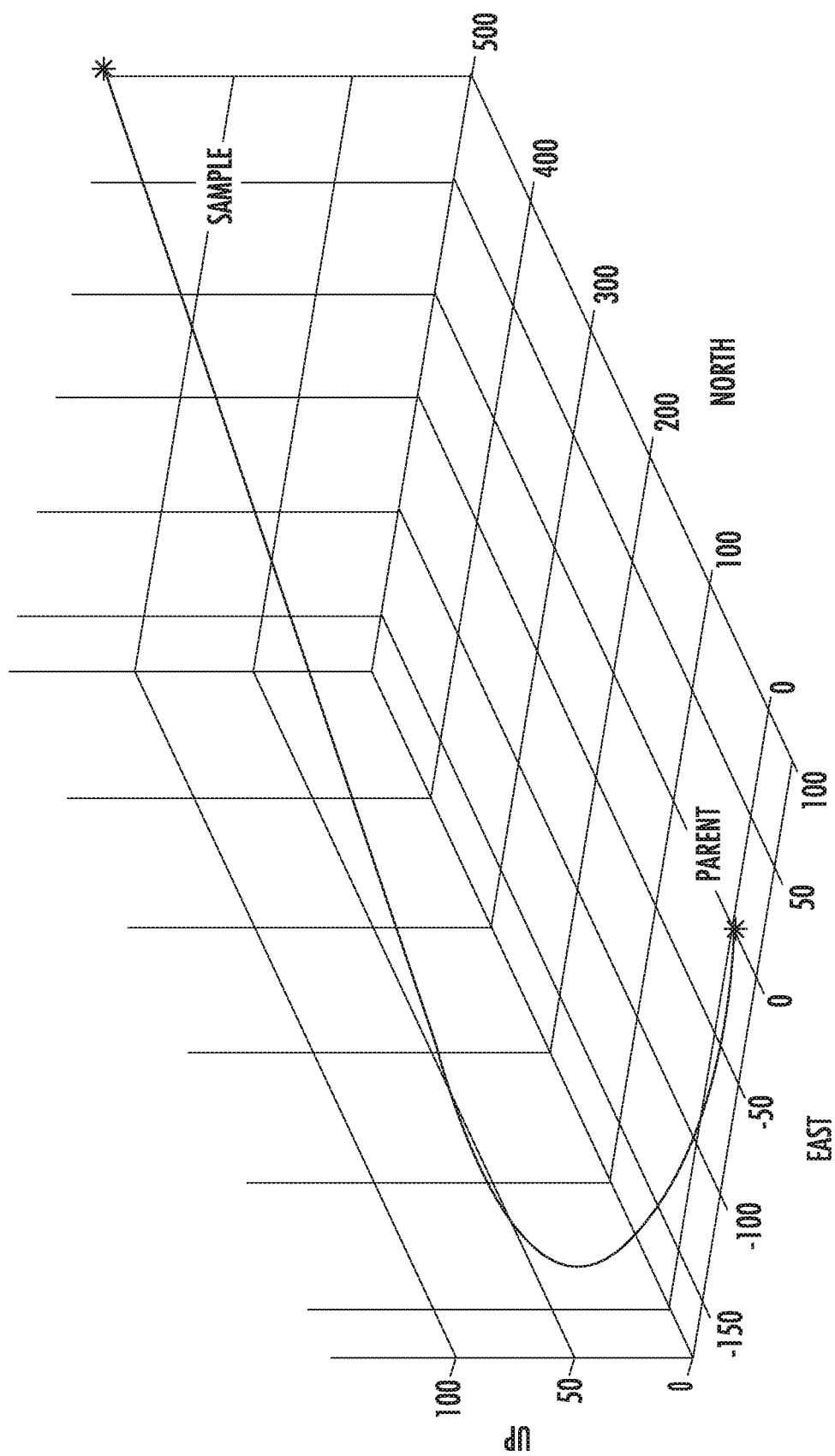
FIG. 11 is a graph of example paths in accordance with one or more embodiments.

As an example of such a path, FIG. 11 illustrates an example of a 3D Dubins path between a parent candidate and a sample point. In this example, the altitude difference between the start and end can be achieved by flying at a constant climb angle, as depicted in FIG. 11.

If the condition in Equation (9) is not satisfied, it means that the altitude difference between the start and end is too big to be achieved by flying the 2D path with constant climb or descend angle $\pm\gamma_{max}$. In this case, the inventors extend the 2D Dubins path by following a helical path with climb (descend) angle of $\pm\gamma_{max}$ and spiraling a certain number of turns at the end of the Dubins path until the vehicle reaches the desired altitude. The equation of a helical path with center at (0,0,0), radius of R and climb angle of $\gamma_{max}$ that is parameterized by variable can be written as $$n = R \cos \xi \quad (11)$$

$$e = R \sin \xi \quad (12)$$

$$u = \xi R \tan \gamma_{max} \quad (13)$$

where $\xi \in [0, t_f]$. The length of the helix is equal to $$L_{helix} = t_f \sqrt{R^2 + (R\tan\gamma_{max})^2} \quad (14)$$

$$= t_f \frac{R}{\cos\gamma_{max}} \quad (15)$$

Consider now $\Delta Z_{des}$ as the desired altitude difference between the end of Dubins path and the sample point $$\Delta Z_{des} = u_{\tilde{q}_s} L_{2D}(\tilde{q}_s)\tan \gamma_{max} \quad (16)$$

where the term "$L_{2D}(\tilde{q}_s) \tan \gamma_{max}$" is the maximum altitude achieved at the end of the Dubins path with climb angle of $\gamma_{max}$. Note that for simplicity similar to the rest of this section it is assumed that the parent node location is at (0,0,0).

If $\Delta Z_{des}$ is achieved by the helix, using Equation (13) the inventors have $$\Delta Z_{des} = t_f R \tan \gamma_{max} \quad (17)$$

and then combining equations (17) and (15), the inventors get $$L_{helix} = \frac{\Delta Z_{des}}{\sin\gamma_{max}} \quad (18)$$

Figure 12A:
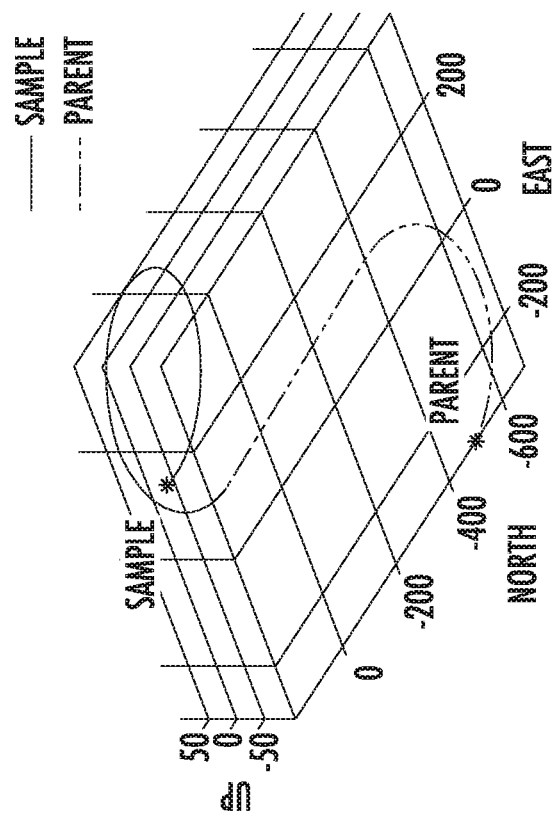
FIG. 12A is a graph of an example path in accordance with one or more embodiments.
Figure 12B:
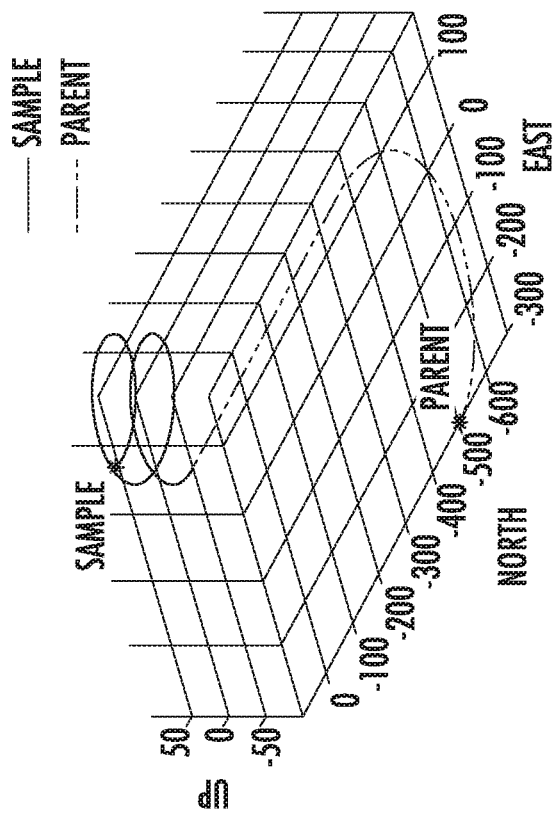
FIG. 12B is a graph of an example path in accordance with one or more embodiments.

Note that reaching the desired altitude with a fixed climb angle can be achieved by various turn radiuses. However, Equation (19) shows that the length is independent of the turn radius because smaller turn radiuses requires more turns and bigger turn radiuses requires less turns. FIGS. 12A and 12B show examples of the extended Dubins path with spiral at the end point. The red part (e.g., depicted by the dashed line) of the path in FIGS. 12A and 12B is the Dubins path with maximum climb angle and the blue part (e.g., depicted by a solid line) is the spiral until the sample point is reached. Note that the length of the path in FIG. 12A is the same as FIG. 12B despite the fact that the spirals have different turn radiuses.

Once the length of the helical path is obtained, the total length of the path is $$L_{3D}(\tilde{q}_s) = \frac{L_{2D}(\tilde{q}_s)}{\cos\gamma_{max}} + L_{helix} \quad (19)$$

The inventors can now summarize the 3D length of Dubins path between candidate parent and sample point as follows $$L_{3D}(\tilde{q}_s) = \begin{cases} \frac{L_{2D}(\tilde{q}_s)}{\cos\gamma^*}; & -\gamma_{max} \leq \gamma^* = \tan^{-1}\left(\frac{u_{\tilde{q}_s}}{L_{2D}(\tilde{q}_s)}\right) \leq \gamma_{max} \\ \frac{L_{2D}(\tilde{q}_s)}{\cos\gamma_{max}} + L_{helix}; & \text{otherwise} \end{cases} \quad (20)$$

The described 3D Dubins distance cost have several benefits. One is that it all can be analytically evaluated very fast without actually creating the path. The second benefit of this approach is that the maximum climb/descend angle $\pm\gamma_{max}$ can be set arbitrarily to a small number if the designer wishes to penalize the parents that are not in the same altitude of the sample. By setting $\gamma_{max}$ very close to zero, the distance cost of the candidate parents that are not at the same altitude as the sample will be a very large number. As such, these parents will be given lower priority in the choose parent procedure. This is one way that the designer can force the planner to go around the obstacles as opposed to go over them. Additionally, it is noted that in practice the maximum climb/descend angle of the vehicle, $\pm\gamma_{max}$, is a function of airspeed, engine performance, and atmospheric conditions. Therefor, $\gamma_{max}$ can be obtained from a look-up table instead of being constant.

The DistanceCost given by $L_{3D}(\tilde{q}_s)$ is then combined with a RegionCost for the trajectory between $q_{candidate}$ and $q_s$. A straight line trajectory between $q_{candidate}$ and $q_s$ is assumed for calculating this RegionCost. The DistanceCost and RegionCost for $q_{candidate}$ are combined as noted above. All of the candidate nodes $q_{candidate} \in \mathcal{T}$ are sorted from lowest to highest cost.

In the for loop beginning on line 4 of algorithm 2, the inventors attempt to add $q_s$ to the tree starting with the best (lowest cost) $q_{candidate}$. Once $q_s$ is successfully added to the tree, the loop is exited. In line 5, the reference path from the tree root to $q_s$, through candidate parent node q, is formed. This reference path is used as input to the predictor in line 6. In line 7, the inventors check whether the predicted trajectory $\vec{x}$ is in the free space of the environment. If the predicted trajectory is free, the sampled node is added to the tree with parent q. Otherwise, the inventors return to line 5 and try the next best candidate parent node.

Propagating the trajectory predictor and checking the resulting predicted trajectory against environmental constraints are orders of magnitude slower than the analytic cost evaluation. Therefore, it is advantageous to minimize the number of iterations through the for loop beginning at line 4. One may choose to stop the algorithm after a maximum number of iterations, $\text{iter}_{max} \leq 10$. In this case, the sample is not added to the tree and the algorithm is restarted with a new sample.

When $q_s$ is added to the tree, $q_s$. cost is assigned as the total cost of the predicted path $\hat{\vec{x}}$ from line 6. The rest of the state variables of the sample (such as velocity and heading) is obtained from the end of the predicted path $\hat{\vec{x}}$. Finally, $q_s$. cost2go is assigned as described below.

4.3 Cost-to-Go Estimation

The cost-to-go is a lower bound on the cost from the nodes position to the local goal. The cost-to-go is the three dimensional Euclidean distance between the node position and the local goal. For local goal $l = \{l_e, l_n, l_u\}$ and node $q = \{q_e, q_n, q_u\}$, the cost-to-go is defined by $c2g = \|l - q\|$.

4.4 Sampling Reference Frame

A sampling strategy may be employed that is mindful of the constraints imposed by the dynamic limitations of the vehicle. The strategy is composed of two parts, choosing a reference azimuth for the sampling cone and the method of sampling.

4.5 Blended Vehicle Heading and Reference Path Heading

At low speed and near hover, it is preferred (but not a necessity) to sample along the direction of vehicle's true heading. This is because transition time for the vehicle's true heading to merge toward the reference path azimuth is much longer. And not being able to sample in front of the vehicle during that time could undermine finding the best plan. At medium to high speed, however, the inventors may choose to sample in the direction of the reference path (i.e., commanded direction of travel) to avoid subsequent reference paths oscillating in alternate directions around obstacles.

Figures 13, 14:
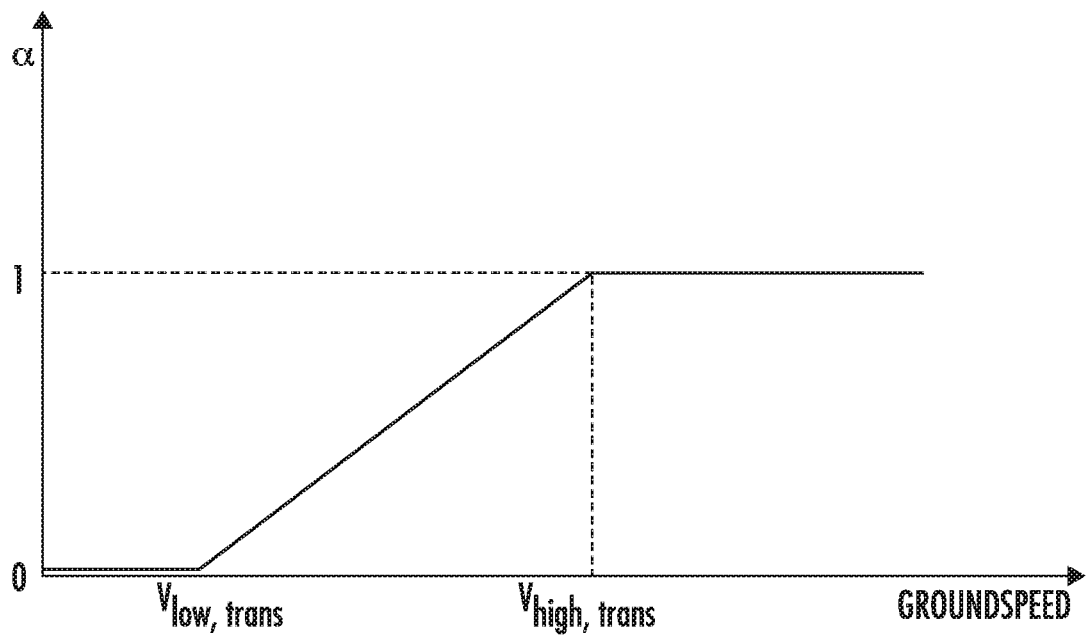
FIG. 13 is a graph in accordance with one or more embodiments.
FIG. 14 depicts example Algorithm 3 in accordance with one or more embodiments.

Given the vehicle's true heading $\psi_{veh}$ and the reference path azimuth $\psi_{ref}$, the inventors used blended heading, $\psi_{blended}$, for the azimuth of the sampling cone as $$\psi_{blended} = (1-\alpha)\psi_{veh} + \alpha\psi_{ref}, \alpha \in [0,1] \quad (21)$$

where $\alpha$ is a function of speed; at low speed $\alpha$ is zero, at medium/high speed is one and linear in between. In other words:

$$\alpha = \begin{cases} 0; & V \leq V_{low,trans} \\ 1; & V \geq V_{high,trans} \\ \text{linear}; & V_{low,trans} < V < V_{high,trans} \end{cases} \quad (22)$$

where $V_{low,trans}$ and $V_{high,trans}$ are the groundspeed values for blending the heading and where FIG. 13 is a graph that depicts a as a function of groundspeed.

4.6 Method of Sampling

3D Cone Sampling. The inventors proceed with specifying the minimum and maximum radius of the samples with respect to the vehicle location. In this way, one can ensure the samples are not too close to the vehicle and also not too far past the sensor horizon.

Given $D_{min}$ and $D_{max}$ are the minimum and maximum sample radius with respect to vehicle, selecting $$\sigma_r = \frac{D_{max} - D_{min}}{6} \quad (23)$$

$$\mu_r = D_{min} + 3\sigma_r$$

guarantees that $r_{sample} \in [D_{min}, D_{max}]$. note that "$\sigma$" is used for standard deviation and "$\mu$" is used for mean of a random variable. Note that $D_{min}$ can be a function of groudspeed; inventors intend for the samples to be $t_{min}$ seconds ahead of the tree root and $D_{max}$ is slightly larger than the sensor horizon $$D_{min} = t_{min} V \quad (24)$$

$$D_{max} = 1.1 \times \text{Sensor Range} \quad (25)$$

where V is the groundspeed. The inventors then calculate the radius and azimuth of the samples $$r_{sample} = \mathcal{N}(0,1)\sigma_r + \mu_r \quad (26)$$

$$\psi_{sample} = \mathcal{N}(0,1)\sigma_\psi \quad (27)$$

$$l = r_{sample} \cos(\psi_{sample}) \quad (28)$$

where $\mathcal{N}(0,1)$ is a random Gaussian number with zero mean and variance of one. Also, l is the projections of the sample radius into the sample cone's major axis. Given the root location $(n_o, e_o, u_o)$, the sample location in ENU-frame is calculated via $$n_{sample} = n_o + r_{sample} \cos(\psi_{sample} + \psi_{ref}) \quad (29)$$

$$e_{sample} = e_o + r_{sample} \sin(\psi_{sample} + \psi_{ref}) \quad (30)$$

$$u_{sample} = u_o + l \tan(\gamma_{max}) \mathcal{N}(0,1) \quad (31)$$

The $\psi_{ref}$ is the sample cone's reference azimuth that was discussed in Section 4.5. Note also that in this approach the samples elevation angle is guaranteed to be $\gamma_{sample} \in [-\gamma_{max} + \gamma_{max}]$.

4.7 CL-RRTAV Execution Loop

Online planning in a dynamic environment can require plans be continuously evaluated against changing environmental constraints and updated accordingly. As a result, the tree grown in CL-RRTA Vis constantly grown as the motion plan is being executed to find new predicted trajectories that are free of obstacles and reach the moving local goal. A method of growing the tree online and choosing the best plan to execute is shown in Algorithm 5 (as depicted in FIG. 16).

Since growing the tree in Algorithm 2 is computationally intensive, the inventors preserve the tree as much as possible as the vehicle flies. The Move Root procedure in Algorithm 3 (as depicted in FIG. 14) demonstrates how the root in the tree is moved in the tree along the best trajectory.

The root is moved forward by time $\Delta t$ along the predicted trajectory in the tree, $\hat{\vec{x}}_{best}$. The new root, assigned in line 3 of Algorithm 3, is simply the vehicle state at time $\Delta t$ in $\hat{\vec{x}}_{best}$. The node that is being tracked by the trajectory predictor at time $\Delta t$ is assigned the new root as its parent.

The way that the root is moved in the tree in Algorithm 3 allows nodes that are descendants of $q_{child\_of\_root}$ to be preserved, while the rest of the tree is pruned according to the procedure in Algorithm 4 (as depicted in FIG. 15). This saves the computational effort of re-growing the saved part of the tree.

Figure 17:
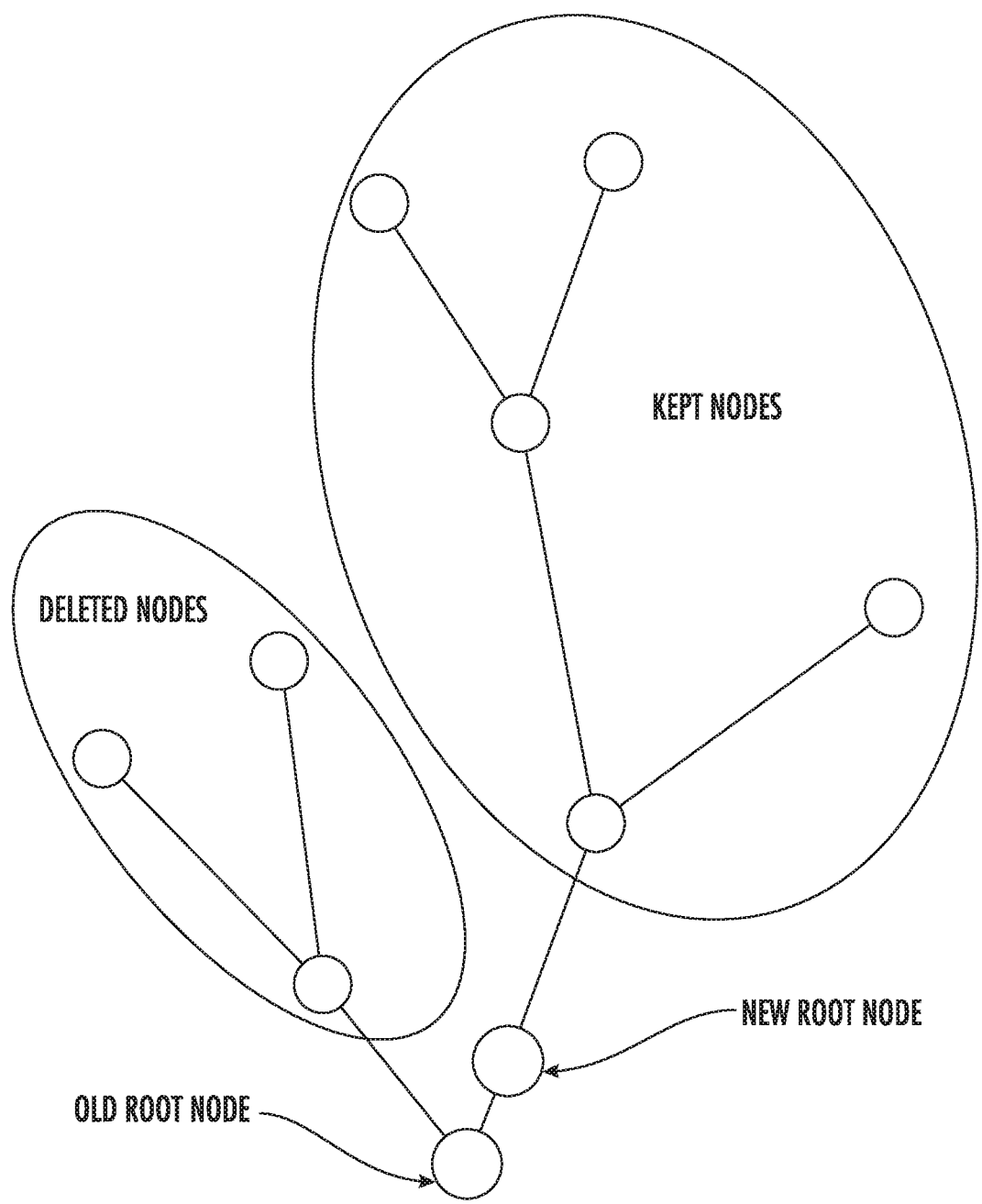
FIG. 17 depicts an example tree in accordance with one or more embodiments.

FIG. 17 shows an example of which nodes are pruned and which nodes are kept during the PruneTree( ) procedure. The procedure in Algorithm 4, used to determine which nodes are pruned and which are deleted, traverses the entire tree starting at the old root in FIG. 17. The procedure in Algorithm 4 deletes all nodes until it reaches the new root node.

In Algorithm 5, the state of the vehicle is represented by $\vec{x}(t)$ for some $t \in [0, \inf)$. Due to a (potential for) tracking error when the best predicted trajectory $\hat{\vec{x}}_{best}$ is followed by the controller (executed in FCC 75), the vehicle state $\vec{x}(t)t$ may differ from the root state $\vec{x}_{root}(t)$ As a result, the best predicted trajectory in the tree $\hat{\vec{x}}_{best}$ will differ from the trajectory $\hat{\vec{x}}_{best,reprop}$ followed by the controller.

Algorithm 5 starts on line 2 by obtaining the latest vehicle state $\mathcal{T}$ estimate $\vec{x}(t_o)$ from the estimation module and environment $\chi_{free}$ from the perception module. The local goal is updated every iteration of the Execution loop in line 3. The placement of the local goal relative to the current vehicle state and global trajectory is discussed further below.

In line 4 of Algorithm 5, the inventors use the predictor along with the best reference path from the previous execution loop iteration to estimate where the vehicle will be after Δt seconds. By the time this iteration has completed and the inventors are ready to send a new reference path to the trajectory follower for execution, this is the state the inventors expect the vehicle to be in. The committed trajectory refers to the predicted trajectory $\hat{\vec{x}}(t)$ for $t \in [t_0, t_0+\Delta t]$. This is the trajectory that the vehicle will be flying during this iteration of the execution loop and cannot be changed. Similarly, in line 5 the root is advanced by Δt seconds.

In the case that the root state and the predicted vehicle state have exceeded the distance $d_{max}$ from each other, the root is reset to the predicted vehicle state. When this happens, all the nodes in the tree are deleted, other than the root. The value of $d_{max}$ is typically set to around 100 meters (although other values can be utilized). If the threshold $d_{max}$ is not exceeded, then the PruneTree( ) function is run in line 10.

The ExpandTree( ) function is then run for as much time as is available. The entire execution loop iteration is run for Δt seconds. The inventors expect that everything from line 15 to 24 will take about δ seconds, so ExpandTree( ) may be run until the current execution loop iteration has been running for Δt−δ seconds.

Once the tree has been grown, a new best sequence of nodes is chosen in the tree for execution. This is done by sorting all nodes from best to worst. The following preferences are used (but not a necessity) to sort the nodes in the tree, in order from best to worst:

1) Nodes with FREE RegionCost, with position inside the local goal, from lowest to highest cost; 2) Nodes with FREE RegionCost, with position outside the local goal, from lowest to highest cost-to-go; 3) Nodes with BUFFER RegionCost, with position inside the local goal, from lowest to highest cost; and 4) Nodes with BUFFER RegionCost, with position outside the local goal, from lowest to highest cost-to-go.

The inventors then test each node in sorted order to determine if it is valid for execution by the vehicle. Once a valid node for execution has been found, the best reference trajectory is sent to the trajectory follower flight controller for execution. This ends the current execution loop iteration. If no node is valid for execution, then an emergency "safe" action is performed.

The repropagation step in line 17 of Algorithm 5 checks whether the node is safe when reached from the predicted vehicle position. Recall that each branch in the tree is grown from the tree root which may differ from the predicted vehicle position. Further, obstacles that were not present when the original path to the node was added to the tree may have appeared. These obstacles could make the paths to some nodes in the tree unsafe. The inventors could repropagate the entire tree from the predicted vehicle position and check each path against the updated obstacle map every execution loop iteration, but this would be very costly to perform on the entire tree. Instead, the lazy repropagation performed (Kuwata et al, 2009) only when a path in the tree is chosen for execution can save significant computational effort. The repropagation is done in line 17 by finding the predicted trajectory from the predicted vehicle state $\vec{x}(t_0+\Delta t)$ through each node in the reference path. This predicted path is evaluated against the updated environment in line 18.

4.7.1 Global Following

Figure 18A:
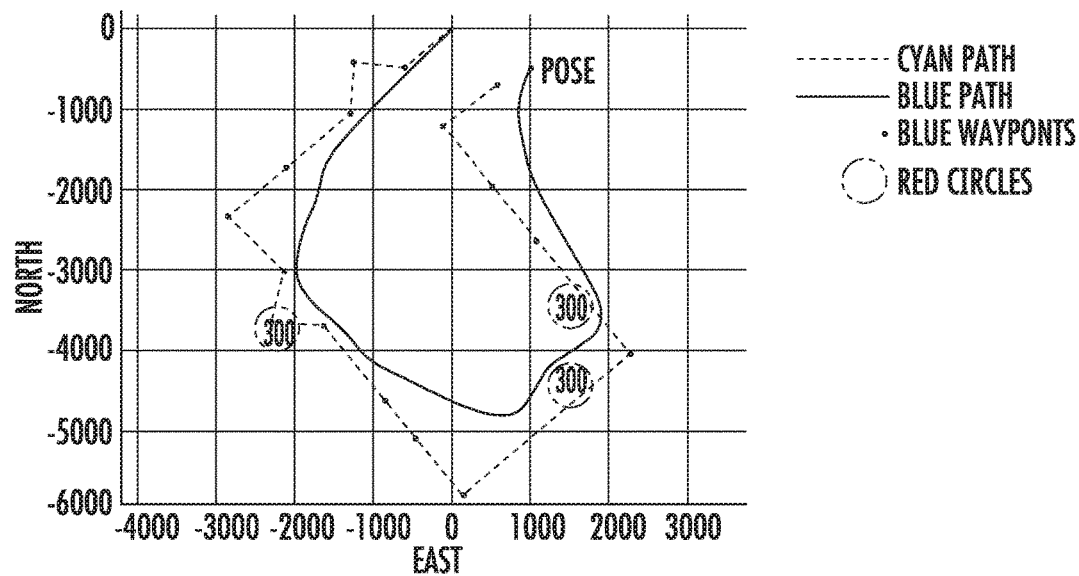
FIG. 18A depicts an example path without global following in accordance with one or more embodiments.
Figure 18B:
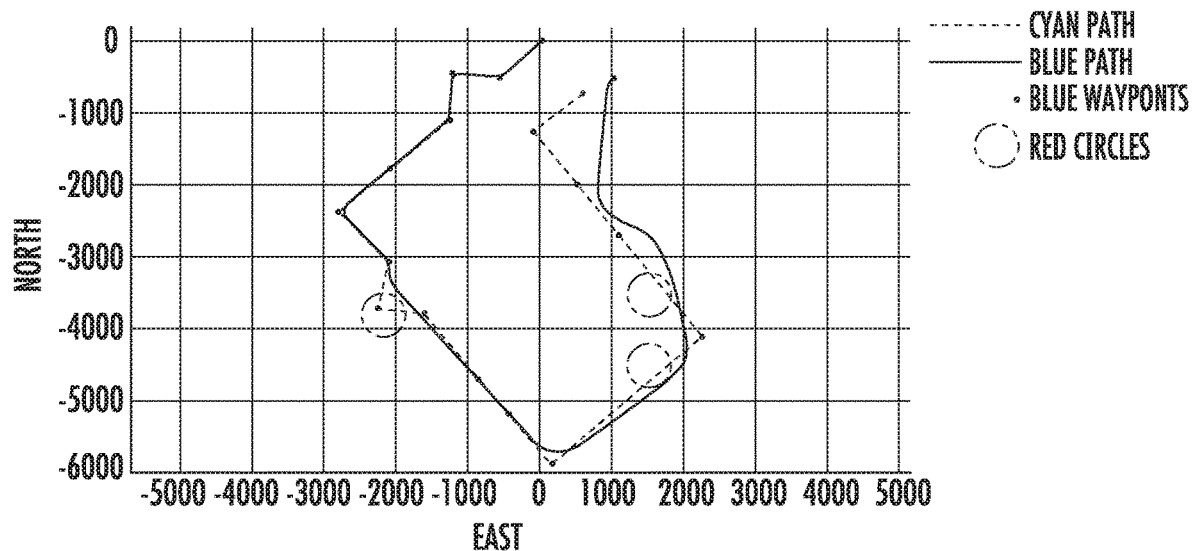
FIG. 18B depicts an example path without global following in accordance with one or more embodiments.

The Global Following procedure was developed specifically for the CL-RRTAV algorithm. Without global following, tracking of the global path could be poor. Because the vehicle always chooses a path to the local goal, it could have a tendency to cut corners. FIG. 18A shows CL-RRTAV path without global following and FIG. 18B shows the CL-RRTAV path with global following. The blue path and blue waypoints represent the global path, the red circles are obstacles along the way. Note that in the simulation the vehicle has a 1000 meter sensor range (which could be greater or less in some embodiments), so it can only see obstacles within the sensor range. The diameter of obstacles are written inside the circles. The cyan path is taken by the CL-RRTAV algorithm in both cases (with and without global following). The start location of the vehicle is illustrated in the figure by "pose".

Global Following prevents this behavior by merging the path found by the CL-RRTAV Expand tree procedure into the global path. It then locks in this path and does not allow any changes unless the chosen path becomes obstructed. This increases path consistency and provides better tracking of the global path in most situations. It is possible, however, that a better path will be found but not chosen for execution.

The global following procedure added to the execution loop is shown in Algorithm 6 as depicted in FIG. 19. The status of "Global Following" can be either "active" or "inactive." At the beginning of the algorithm 6, in line 1, Global Following is inactive.

The GlobalFollowing( ) function, shown in Algorithm 7 as depicted in FIG. 20, takes a reference path in the tree. It then appends the local goal and any remaining global path waypoints after the local goal to the reference path. This reference path is passed to trajectory predictor beginning from the tree root, and the predicted path is evaluated against the environmental constraints. If the predicted path is free, the global reference path is returned. Otherwise, null is returned.

In lines 12-17 of Algorithm 6, a reference path consisting of just the root node is sent to the GlobalFollowing( ) procedure. If GlobalFollowing( ) does not return null, Global Following is turned to active. In lines 21-29 of Algorithm 6, if Global Following is active, the global following reference path $\vec{r}_{ref,global}$ is repropagated from the predicted vehicle state. If the path is free of obstacles, then the global reference path is sent to the trajectory follower for execution, and this iteration of the execution loop is complete. Lines 35-43 are reached if global following is inactive. After a new reference path is chosen, the reference path is sent to the GlobalFollowing( ) function in line 35 of Algorithm 6. If the function does not return null, the global reference path if re-propagated via the trajectory predictor. If free of obstacles, the global reference path is sent to the trajectory follower for execution and this iteration of the execution loop is complete.

Note that once Global Following becomes active, the only way for it to become inactive is if the global path becomes obstructed by an obstacle during the check on line 23. The following change can be made to accommodate RegionCost: if the propagated global path using the predictor, $\hat{\vec{x}}_{reprop.global}$ has RegionCost of BUFFER, then global following becomes inactive if any path in the tree is found with RegionCost FREE and the best trajectory with RegionCost FREE is chosen for execution. In Algorithm 6, if the propagated global path using the predictor has RegionCost of BUFFER, then inventors will wait to execute lines 24-25 until the for-loop beginning line 31 has confirmed that there are no repropagated paths in the tree with RegionCost of FREE.

5 Calculating Sample Speed

The groundspeed for the sample points in the tree are not randomly sampled as it in introduces another dimension to the search problem which results in slow performance. The speed of the sample points depends on the "From" and "To" waypoints.

5.1 Speed Assignment

The groundspeed for the sample points in the tree are calculated as a function of the local-goal speed and the parent node's speed. Note that the local-goal speed $v_{goal\ is}$ extracted from the predicted path.

The Algorithm 8 (depicted in FIG. 21) is used to calculate the groundspeed of the sample nodes. In the algorithm $p_{sample}$, $P_{goal}$, $P_{parent}$ are the position of sample, goal, parent node in ENU-frame. Also, $v_{parent}$ is the speed assigned to the parent node. The output of Algorithm 8 is the speed of the sample point $v_{sample}$. The algorithm tries to find the speed in which vehicle can go forward from the parent location to the sample with maximum acceleration/deceleration. It then tries backward phase in which it goes from the local-goal location to the sample location with maximum acceleration/deceleration. It then takes the minimum of the forward and backward speed.

6 Local-Goal Selection

As mentioned earlier in order to be able to follow the global path as closely as possible, a local-goal is placed on the global path and the local planner is asked to plan to the local-goal. Different strategies can be used for selecting the local-goal. For example, the local-goal can be a fixed point on the global path and as the vehicle reaches to a certain distance of the local-goal, the local-goal is moved to a new location. Also, the local-goal can be a moving point on the global path with a certain distance from the vehicle. Selection of the local-goal is a trade-off between obstacle avoidance capability and global path following. For instance, consider an example in which the vehicle has to follow an L-shape global path. If the local-goal is placed close to the vehicle, the CL-RRTAV algorithm can generate motion plans that follows the turn very closely. However, if an obstacle pops up between the vehicle and the local-goal, the CL-RRTAV algorithm might not have enough time to generate an obstacle-free path. On the other hand, if the local-goal is placed far from the vehicle, the tracking of the L-shape global path is sacrificed as most of the RRT paths to the local-goal tend to cut the corner of the L-shape trajectory. However, if an obstacle pops up between the vehicle and the local-goal, most likely there are better paths in the tree to choose from.

6.1 Placing Local-Goal At The End Of Perception Horizon

The inventors choose to place the local-goal at the end of the sensor horizon which allows for the most reliable obstacle collision avoidance approach, in one or more embodiments. However, as mentioned in the previous subsection, this comprises path quality on L-shaped turns where the planner could possibly cut corners. The local-goal is constantly updated every step to ensure that it is always placed at the end of the sensor horizon unless it is obstructed. If the point at the end of sensor horizon is obstructed, the local-goal is moved forward until an unobstructed point is found.

In order to generate a speed for the local-goal, once a new global path is received, the global path is processed using the trajectory predictor to generate the ideal trajectory that the vehicle will travel if no obstacles are encountered along the path. The output trajectory of the predictor is saved and this same output is used for every local-goal selection for the mission. The local-goal is placed by iterating from the beginning of the predictor trajectory and finding the first point in the trajectory that is greater than sensor horizon distance from the current vehicle position and not obstructed. The local-goal is never placed behind the previous local-goal placements to ensure the vehicle continues moving forward towards the mission goal point. The local-goal is set using all the output states of the trajectory predictor which means it includes speed, heading, heading rate, roll, roll rate, etc.

7 Closed-loop Tracking Error Considerations

There could potentially be modeling errors, wind, and disturbances that affect how the trajectory follower tracks the reference path. The local planner could adjust the reference path to reduce the tracking error. However, doing so introduces an additional feedback loop to the system. To ensure the tracking error does not cause collision with obstacles, the inventors introduce horizontal and vertical buffers around the obstacles as mentioned in the previous section. The value of horizontal and vertical buffers should be larger than the maximum cross-track and vertical tracking error of the closed-loop system.

Figure 5:
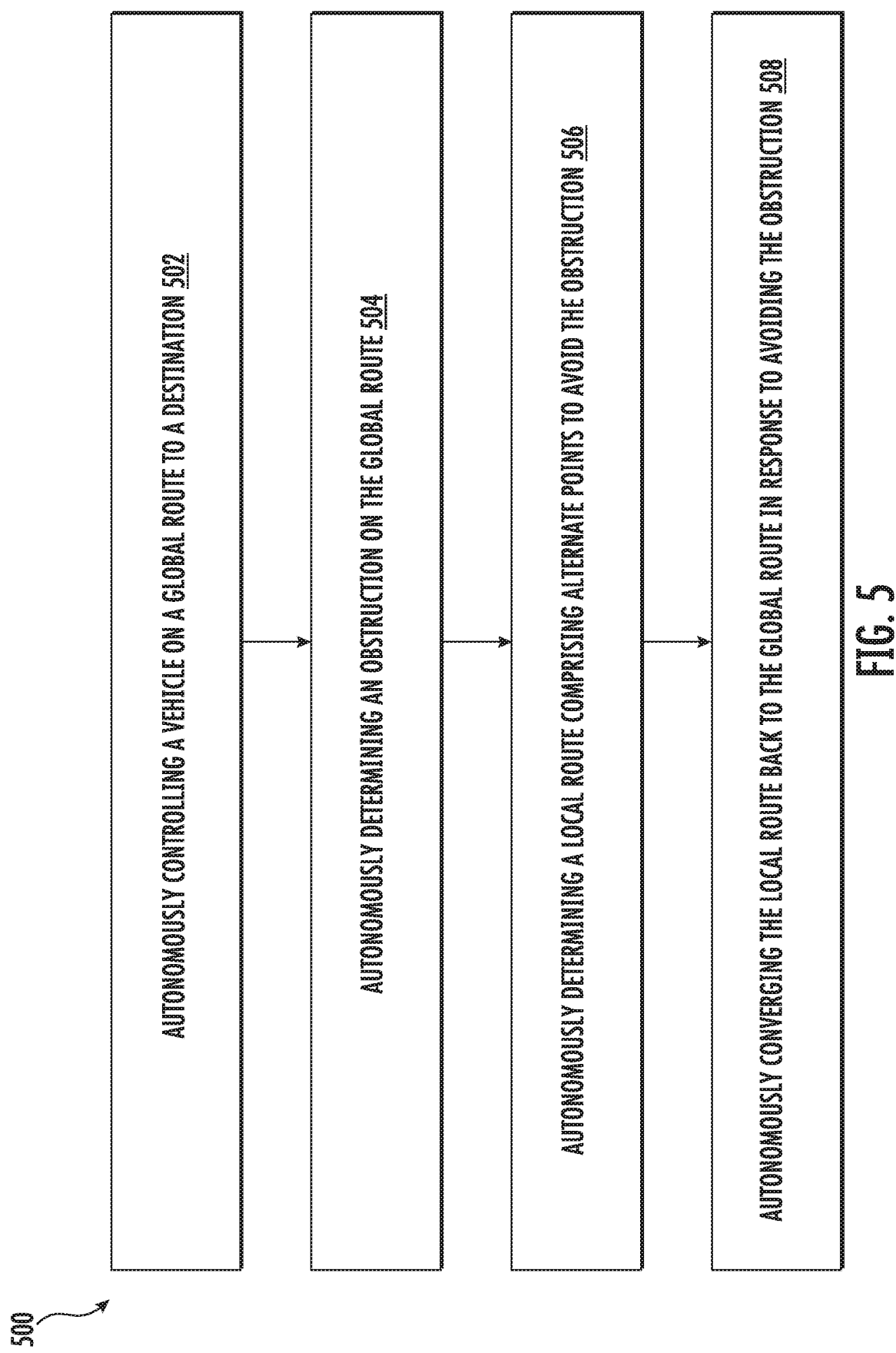
FIG. 5 depicts a flow chart of a method for obstacle avoidance in accordance with one or more embodiments.

Moving away from the section headings, FIG. 5 depicts a flow chart of a method 500 for autonomous obstacle avoidance in accordance with an embodiment. At block 502, the local motion planner module 202 of FCC 75 is configured to autonomously control a vehicle (e.g., aircraft 10) on a global route 330 to a destination in a 3D space. At block 504, the local motion planner module 202 of FCC 75 is configured to autonomously determine an obstruction 336 on the global route 330. At block 506, the local motion planner module 202 of FCC 75 is configured to autonomously determine/generate a local route 350 comprising alternate points (e.g., waypoints 320) to avoid the obstruction 336. At block 508, the local motion planner module 202 of FCC 75 is configured to autonomously converge the local route 350 back to the global route 330 in response to avoiding the obstruction 336.

Further, the global route 330 is planned in advance prior to determining the local route 350 to avoid the obstruction. The global route 330 comprises points (e.g., waypoints 310). The local route 350 avoids one or more of the points (e.g., waypoints 310) on the global route 330 by following the alternate points (e.g., waypoints 320). The global route 330 comprises segments 340. The local route 350 avoids one or more of the segments 340.

Converging the local route 350 back to the global route 330 in response to avoiding the obstruction 336 comprises locking back to one or more segments 340 of the global route 330 after determining the local route 350 to avoid the obstruction 336. Converging the local route 350 back to the global route 330 in response to avoiding the obstruction 336 comprises determining that a different route (e.g., alternate route 360) other than the global route 330 is available to the destination after determining the local route to avoid the obstruction. Converging the local route 350 back to the global route 330 in response to avoiding the obstruction 336 further comprises determining to reject the different route (e.g., alternate route 360) to the destination and instead return back to the global route 330. The vehicle is an aircraft.

Figure 6:
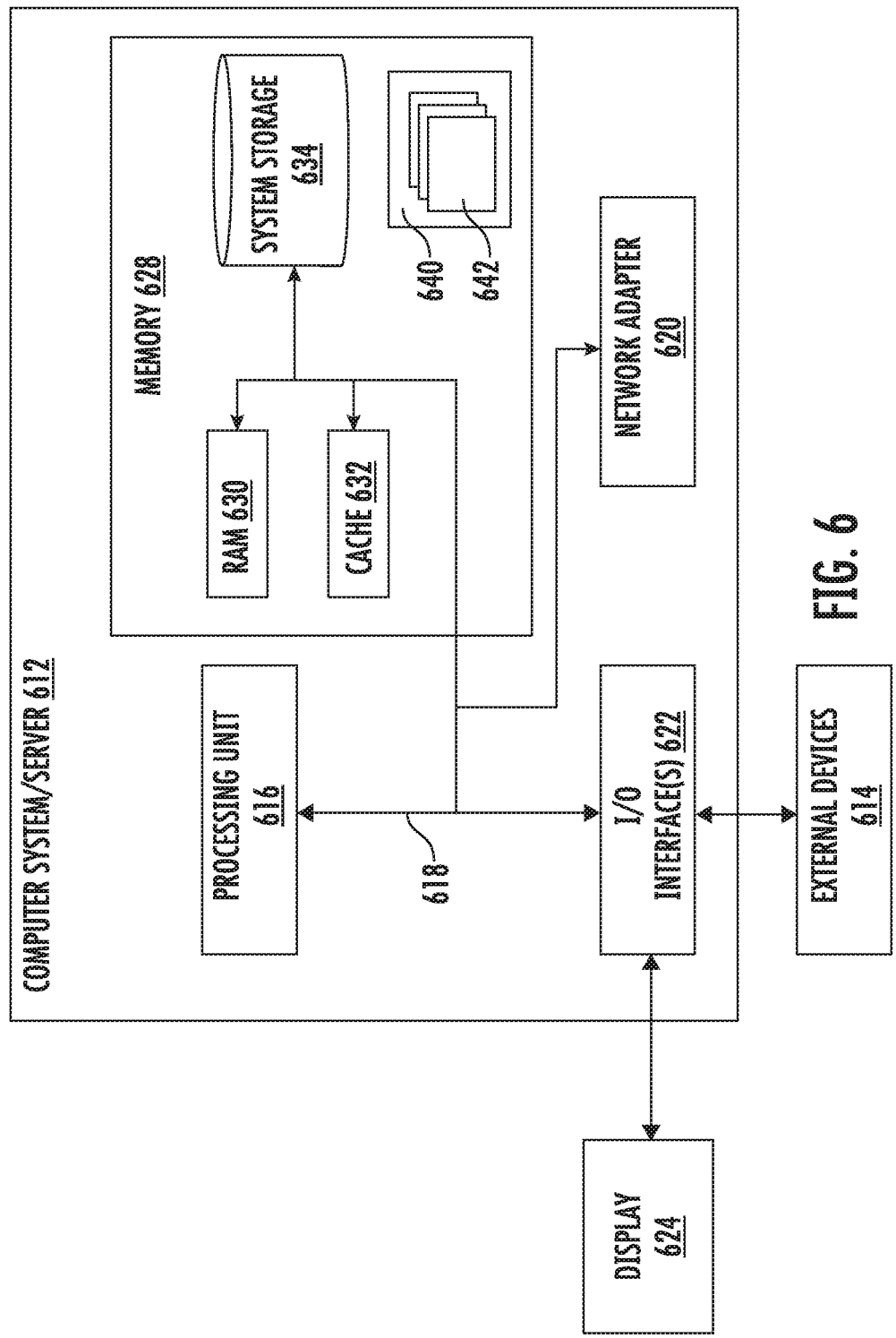
FIG. 6 depicts a schematic of an example computing system having functions and features utilized in accordance with one or more embodiments.

FIG. 6 depicts a schematic of an example computing system 612 having functions and features utilized according to one or more embodiments. The computer system 612 can be operational with numerous other general purpose or special purpose computing system environments or configurations. The computer system 612 can be representative of various types of computer systems on which operations and functions can run in the aircraft 10. The functions and capabilities of computing system 612 can be utilized in FIGS. 1-5 to implement one or more features of the flight control system 70 including flight control computer 75, local motion planner module 202, etc., according to embodiments.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

The components of computer system 612 may include, but are not limited to, one or more processors or processing units 616, a system memory 628, and a bus 618 that couples various system components including system memory 628 to processor 616. Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 612 typically includes a variety of computer system readable media. Such media may be any available media that is accessible by computer system 612, and it includes both volatile and non-volatile media, removable and non-removable media. The system memory 628 can include computer system readable media in the form of volatile memory, such as random access memory (RAM) 630 and/or cache memory 632. Computer system 612 may further include other removable/non-removable, volatile/non-volatile computer system storage media. By way of example only, storage system 634 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. Memory 628 may include at least one program product having a set (e.g., at least one) of program modules that are configured to carry out the functions of embodiments.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments as described herein.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via Input/Output (I/O) interfaces 622. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include but are not limited to: microcode, device drivers, redundant processing units, external disk drive arrays, RAID systems, tape drives, and data archival storage systems, etc.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for autonomous obstacle avoidance, the method comprising:

controlling, by a computing system, an aircraft on a first route comprising a first plurality of three-dimensional waypoints defining a plurality of segments to a destination, a trajectory of the aircraft locked by the computing system to follow the first route along the plurality of segments via the first plurality of three-dimensional waypoints until detection of an obstruction;

detecting, by the computing system, the obstruction on a segment of the plurality of segments of the first route;

unlocking, by the computing system responsive to detecting the obstruction on the segment of the first route, the trajectory of the aircraft from following the first route along the plurality of segments;

determining, by the computing system with the aircraft unlocked from following the first route, a second route comprising a second plurality of three-dimensional waypoints to avoid the obstruction detected on the segment of the plurality of segments of the first route; and re-locking, by the computing system, the trajectory of the aircraft from the second route back to the first route to travel along a subsequent segment of the plurality of segments, in response to avoiding the obstruction.

2. The method of claim 1, further comprising determining the first route prior to controlling the aircraft to follow the first route along the plurality of segments.

3. The method of claim 1, wherein each waypoint of the first plurality of three-dimensional waypoints comprises a respective speed at which the aircraft is to travel.

4. The method of claim 1, wherein at least one of the second plurality of three-dimensional waypoints of the second route differs from one or more of the first plurality of three-dimensional waypoints on the first route.

5. The method of claim 1, wherein detecting the obstruction further comprises checking for one or more obstructions at each of the plurality of segments of the first route.

6. The method of claim 1, wherein the second route further comprises one or more second segments to avoid the obstruction detected on the segment of the first route.

7. The method of claim 1, further comprising controlling, by the computing system, subsequent to returning back to the first route, the aircraft along one or more segments subsequent to the subsequent segment of the first route to the destination.

8. The method of claim 1, wherein determining the second route further comprises determining the second route based on a distance of the aircraft to the subsequent segment of the first route while avoiding the obstruction.

9. The method of claim 1, wherein re-locking the trajectory further comprises determining to reject a third route to the destination and instead return back to the first route.

10. A system for autonomous obstacle avoidance, the system comprising:

a computing system having a processor and memory coupled to the processor, configured to:

control an aircraft on a first route comprising a first plurality of three-dimensional waypoints defining a plurality of segments to a destination, a trajectory of the aircraft locked by the computing system to follow the first route along the plurality of segments via the first plurality of three-dimensional waypoints until detection of an obstruction;

detect the obstruction on a segment of the plurality of segments of the first route;

unlock, responsive to detecting the obstruction on the segment of the first route, the trajectory of the aircraft from following the first route along the plurality of segments;

determine, with the aircraft unlocked from following the first route, a second route comprising a second plurality of three-dimensional waypoints to avoid the obstruction detected on the segment of the plurality of segments of the first route; and re-lock the trajectory of the aircraft from the second route back to the first route to travel along a subsequent segment of the plurality of segments, in response to avoiding the obstruction.

11. The system of claim 10, wherein the computing system is further configured to determine the first route prior to controlling the aircraft to follow the first route along the plurality of segments.

12. The system of claim 10, wherein each waypoint of the first plurality of three-dimensional waypoints comprises a respective speed at which the aircraft is to travel.

13. The system of claim 10, wherein at least one of the second plurality of three-dimensional waypoints of the second route differs from one or more of the first plurality of three-dimensional waypoints on the first route.

14. The system of claim 10, wherein the computing system is further configured to check for one or more obstructions at each of the plurality of segments of the first route.

15. The system of claim 10, wherein the second route further comprises one or more second segments to avoid the obstacle detected on the segment of the first route.

16. The system of claim 10, wherein the computing system is further configured to control, subsequent to returning back to the first route, the aircraft along one or more segments subsequent to the subsequent segment of the first route to the destination.

17. The system of claim 10, wherein the computing system is further configured to determine the second route based on a distance of the aircraft to the subsequent segment of the first route while avoiding the obstruction.

18. The system of claim 10, wherein the computing system is further configured to determine to reject a third route to the destination and instead return back to the first route.

* * * * *